US006643803B1

(12) United States Patent
Swoboda et al.

(10) Patent No.: US 6,643,803 B1
(45) Date of Patent: Nov. 4, 2003

(54) EMULATION SUSPEND MODE WITH INSTRUCTION JAMMING

(75) Inventors: Gary L. Swoboda, Sugarland, TX (US); David R. Matt, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/482,902

(22) Filed: Jan. 14, 2000

Related U.S. Application Data

(60) Provisional application No. 60/120,809, filed on Feb. 19, 1999.

(51) Int. Cl.[7] .............................................. G06F 11/00
(52) U.S. Cl. ........................... 714/38; 714/29; 714/799
(58) Field of Search ............................ 714/4, 25, 38, 714/799

(56) References Cited

U.S. PATENT DOCUMENTS

| | | | | |
|---|---|---|---|---|
| 5,331,571 A | * | 7/1994 | Aronoff et al. ............. 324/73.1 |
| 5,737,516 A | | 4/1998 | Circello et al. ......... 395/183.14 |
| 5,828,824 A | | 10/1998 | Swoboda ................ 395/183.01 |
| 5,970,241 A | * | 10/1999 | Deao et al. ................. 712/227 |
| 6,032,268 A | * | 2/2000 | Swoboda et al. ............. 714/30 |
| 6,055,649 A | * | 4/2000 | Deao et al. .................... 714/30 |
| 6,065,106 A | * | 5/2000 | Deao et al. ................. 712/227 |
| 6,081,885 A | * | 6/2000 | Deao et al. ................. 712/220 |
| 6,085,336 A | * | 7/2000 | Swoboda et al. ............. 714/30 |
| 6,112,298 A | * | 8/2000 | Deao et al. ................. 712/227 |
| 6,141,636 A | * | 10/2000 | Sarno et al. .................. 703/23 |

* cited by examiner

Primary Examiner—Scott Baderman
Assistant Examiner—Tim M. Bonura
(74) Attorney, Agent, or Firm—Gerald E. Laws; W. James Brady, III; Frederick J. Telecky, Jr.

(57) ABSTRACT

Emulation and debug circuitry is provided that can be incorporated into a variety of digital systems. A stop mode of operation is provided in which an associated processor stops processing instructions in response to a debug event. A real-time mode of operation is provided in which the processor stops processing background instructions in response to a debug event, but in which high priority interrupts are still processed. While running or suspended, the emulation circuitry can jam an instruction into the instruction register of the processor to cause processor resources to be read or written on behalf of the emulation circuitry. An embodiment of a processor core is provided that is a programmable digital signal processor (DSP) with variable instruction length, offering both high code density and easy programming. Architecture and instruction set are optimized for low power consumption and high efficiency execution of DSP algorithms, such as for wireless telephones, as well as pure control tasks.

19 Claims, 13 Drawing Sheets

|  | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
|  | 202 | 204 | 206 | 208 | 210 | 212 | 214 |  |  |  |  |
| 302 — INST 1 | $PF_1$ | $F_1$ | $D_1$ | $AD_1$ | $AC_1$ | $R_1$ | $E_1$ |  |  |  |  |
| 304 — INST 2 |  | $PF_2$ | $F_2$ | $D_2$ | $AD_2$ | $AC_2$ | $R_2$ | $E_2$ |  |  |  |
| 306 — INST 3 |  |  | $PF_3$ | $F_3$ | $D_3$ | $AD_3$ | $AC_3$ | $R_3$ | $E_3$ |  |  |
| 308 — INST 4 |  |  |  | $PF_4$ | $F_4$ | $D_4$ | $AD_4$ | $AC_4$ | $R_4$ | $E_4$ |  |
| 310 — INST 5 |  |  |  |  | $PF_5$ | $F_5$ | $D_5$ | $AD_5$ | $AC_5$ | $R_5$ |  |
| 312 — INST 6 |  |  |  |  |  | $PF_6$ | $F_6$ | $D_6$ | $AD_6$ | $AC_6$ | $R_6$ |
| 314 — INST 7 |  |  |  |  |  |  | $PF_7$ | $F_7$ | $D_7$ | $AD_7$ | $AC_7$ |

EMULATION SUSPEND MODE WITH INSTRUCTION JAMMING

This application claims priority under 35 USC §119(e)(1) of Provisional Application No. 60/120,809, filed Feb. 19, 1999 (TI-28928PS).

CROSS REFERENCE TO RELATED APPLICATIONS

This application is related to co-assigned application Ser. No. 09/483,367 (TI-28928); Ser. No. 09/481,852 (TI-28929); Ser. No. 09/483,568 (TI-28930); Ser. No. 09/483,697 (TI-28931); Ser. No. 09/483,570 (TI-28933); Ser. No. 09/483,237 (TI-28934); Ser. No. 09/483,783 (TI-28935); Ser. No. 09/481,853 (TI-28936); Ser. No. 09/483,321 (U-28937); and U.S. Pat. No. 6,167,365 (U-27298), filed contemporaneously herewith and incorporated herein by reference.

FIELD OF THE INVENTION

The present invention relates to digital microprocessors, and more particularly to emulating and debugging digital microprocessors.

BACKGROUND OF THE INVENTION

As the technology for manufacturing integrated circuits advances, more and more logic functions may be included in a single integrated circuit device. Modern integrated circuit (IC) devices include large numbers of gates on a single semiconductor chip, with these gates interconnected so as to perform multiple and complex functions, such as, for example, those in a general-purpose microprocessor. The manufacture of such circuits incorporating such Very Large Scale Integration (VLSI) requires that the fabrication of the circuit be error free, as some manufacturing defects may prevent it from performing all of the functions that it is designed to perform. This requires verification of the design of the circuit and also various types of electrical testing after manufacture.

In conjunction with the stuck-fault modeling and associated test generation, other circuitry may be included in the VLSI circuit specifically designed to improving its testability. One type of test circuitry is a scan path in the logic circuit. A scan path consists of a chain of synchronously clocked master/slave latches (or registers), each of which is connected to a particular node in the logic circuit. These latches can be loaded with a serial data stream ("scan in") presetting the logic circuit nodes to a predetermined state. The logic circuit then can be exercised in normal fashion, with the result of the operation (at each of the nodes having a scan latch) stored in its respective latch. By serially unloading the contents of the latches ("scan out"), the result of the particular test operation at the associated nodes is read out and may be analyzed for improper node operation. Repetition of this operation with a number of different data patterns effectively tests all necessary combinations of the logic circuit, but with a reduced test time and cost compared to separately testing each active component or cell and all their possible interactions. Scan paths permit circuit initialization by directly writing to the latches (or registers) and directly observing the contents of the latches (or registers). Using scan paths helps to reduce the quantity of test vectors compared to traditional "functional mode" approaches. Techniques for scanning such data are discussed by E. J. McCluskey in *A Survey of Design for Testability Scan Techniques*, VLSI Design (Vol. 5, No. 12, pp. 38–61, December 1984).

Another solution is the test access port and boundary-scan architecture defined by the IEEE 1149.1 standard, a so-called JTAG test port. IEEE 1149.1 is primarily intended as a system test solution. The IEEE 1149.1 standard requires a minimum of four package pins to be dedicated to the test function. The IEEE 1149.1 standard requires boundary scan cells for each I/O buffer, which adds data delay to all normal operation function pins as well as silicon overhead. Although it has "hooks" for controlling some internal testability schemes, it is not optimized for chip-level testing. IEEE 1149.1 does not explicitly support testing of internal DC parametrics.

Software breakpoints (SWBP) provide another mechanism to allow the debug of microprocessor code and to evaluate performance. A SWBP is typically accomplished through opcode replacement, provided the program resides in a writable memory module which allows the opcode at the stop point to be replaced in memory with the software breakpoint opcode. In most machines, when a SWBP opcode reaches the first execute stage of an instruction execution pipeline, it causes the pipeline to stop advancing or trap to an interrupt service routine, and set a debug status bit indicating the pipeline has stopped or trapped. In processors classified as protected pipelines, instructions fetched into the pipeline after the SWBP are not executed. Instructions that are already in the pipeline are allowed to complete. To restart execution the pipeline can be cleared and then restarted by simply refetching the opcode at the SWBP memory address after the opcode is replaced in memory with the original opcode.

Testing and debugging such a complex pipeline is difficult, even when the techniques described in the preceding paragraphs are used. Aspects of the present invention provide improved methods and apparatus for chip-level testing, as well as system-level debugging.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

A digital system is provided having a processor, wherein the processor is operable to execute a sequence of instructions obtained from an instruction bus connected to an instruction memory circuit, wherein the processor comprises. The processor has system resources including registers and at least one memory circuit. The processor has test port circuitry for receiving test commands from a remote test host. Emulation circuitry for debug events is connected to the test port circuitry, operable to cause the processor to enter a debug suspend state in response to a debug event and to leave the debug suspend state to resume execution of the sequence of instruction in response to a command received by the test port circuitry, wherein execution of the sequence of instructions ceases while the processor is in the debug suspend state. The emulation circuitry is operable to access the system resources in response to an access command received by the test port circuitry. while the processor is executing the sequence of instructions such that execution of the sequence of instructions is not delayed by the access of the system resources.

According to another aspect of the present invention, the processor has an instruction pipeline operable to decode the sequence of instructions, access operands from system resources, and store results in system resources. The detection circuitry is operable to detect a bubble in the instruction pipeline during which no system resource is being accessed in response to executing the sequence of instructions. Jamming circuitry connected to the instruction pipeline is operable to jam an access for a system resource in response to the access command received by the test port circuitry into the bubble detected by the detection circuitry, whereby the access of the system resources in response to the access command is performed without delaying the instruction pipeline.

According to another aspect of the present invention, a method is provided for operating a digital system comprising a processor with system resources including registers and at least one memory circuit, comprising the steps of:

executing a sequence of instructions obtained from an instruction bus connected to an instruction memory circuit;

receiving an access command from a remote test host; and accessing the system resources in response to the access command while the processor is executing the sequence; of instructions such that execution of the sequence of instructions is not delayed by the access of the system resources.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which:

FIG. 10 is a block diagram of the processor illustrating a memory management unit interconnected memory;

DESCRIPTION OF THE PREFERRED EMBODIMENTS

Figure 1:
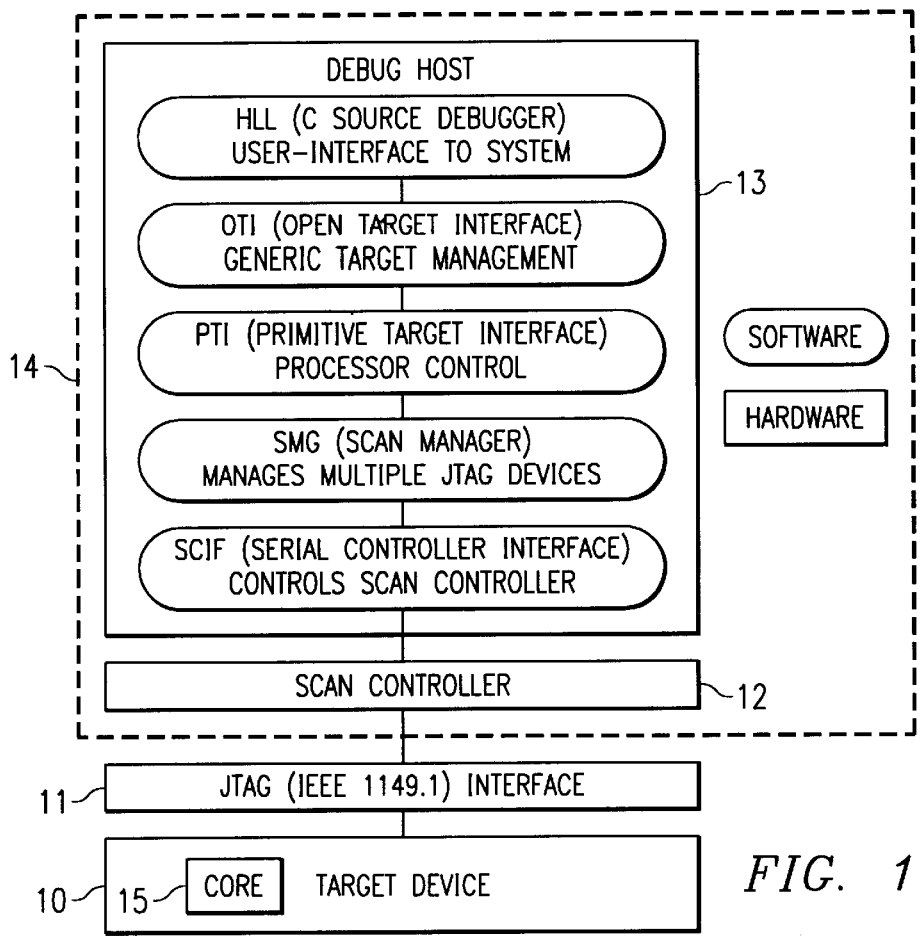
FIG. 1 is a block diagram illustrating an emulation system connected to a target device which embodies aspects of the present invention.

Although the invention finds particular application to Digital Signal Processors (DSPs), implemented, for example, in an Application Specific Integrated Circuit (ASIC), it also finds application to other forms of processors. FIG. 1 is a block diagram of a digital system 10 which has an embodiment of the present invention, and will be described in more detail in later paragraphs. In the interest of clarity, figures herein only show those portions of digital system 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. U.S. Pat. No. 5,828,824 issued to Gary Swoboda describes improvements to an emulation system using extended operating modes and is incorporated herein by reference. An embodiment of the present invention is an improvement on the structure of the IEEE 1149.1-1990 *Standard Test Access Port and Boundary Scan Architecture*, which is incorporated herein by reference. Terms and concepts relating to IEEE 1149.1 which are used herein are explained fully in this IEEE standard. Details of portions of digital systems relevant to an embodiment of the present invention are explained in sufficient detail hereinbelow, so as to enable one of ordinary skill in the microprocessor art to make and use the invention.

FIG. 1 is a block diagram illustrating an emulation/debug system 14 connected to a target device 10 which embodies aspects of the present invention. Test host 13 allows high-level debugging actions to be performed by a user. Debug system 14 is connected to a low-level interface 11 supported by target device 10.

Debug Host 13 is a computer, typically a PC, running the user-interface for a target processor debugger. The debug host allows the user to issue high level commands such as "set breakpoint at function main( )" or "examine the contents of memory from 0x0 to 0x100". The source code for the debugger is available from Texas Instruments Incorporated as an Emulator Porting Kit (EPK), for example.

Scan Controller board 12 is attached to the debug host and is connected to the target device via JTAG interface 11. The Scan Controller performs JTAG state sequences sent to it by the Debug Host. Scan controller 12 can be XDS-510, XDS-510PP or XDS-510WS available from Texas Instruments Incorporated, for example.

Target device 10 contains hardware extensions for advanced debugging features. These assist in the user's development of the application system (software and the hardware). Since these capabilities are part of core processor 15, they are available on any device which includes core processor 15, utilizing only the JTAG interface with extended operating mode enhancements, as described in U.S. Pat. No. 5,828,824. They provide simple, inexpensive, and speed independent access to core 15 for sophisticated debugging and economical system development, without requiring the costly cabling and access to processor pins required by traditional emulator systems or intruding on system resources. The on-chip development interface provides:

- Non-intrusive access to internal and external memory.
- Minimally-intrusive access to CPU and peripheral registers.
- Control of the execution of background code while continuing to service real-time interrupts.
- Break on a software breakpoint instruction (instruction replacement).
- Break on a specified program or data access without requiring instruction replacement (accomplished using bus comparators).
- Break on external attention-request from debug host or additional hardware (XDS-524 or logic analyzer or other processor).
- Break after the execution of a single instruction (single-stepping)
- Control over the execution of code from device power-up.
- Non-intrusive determination of device status.
- Detection of a system reset, emulation/test-logic reset, or power-down occurrence.
- Detecting the absence of a system clock or memory-ready signal.
- Checking if global interrupts are enabled.
- Determining why debug accesses might be blocked.
- Rapid transfer of memory contents between the device and a host (data logging).
- Two 40-bit Parallel Signature Analysis registers (PSA) to verify proper CPU operation at speed.
- A 40-bit cycle counter for performance benchmarking. With a 100 MHz cycle clock, this can benchmark actions up to 3 hours in duration.
- Ability to add more debug capabilities through ASIC macros built from gate-array cells.

In an alternative embodiment, to reduce the silicon cost of emulation support hardware, many of the capabilities above can share the same resources such that they could not be performed in parallel.

Figure 2:
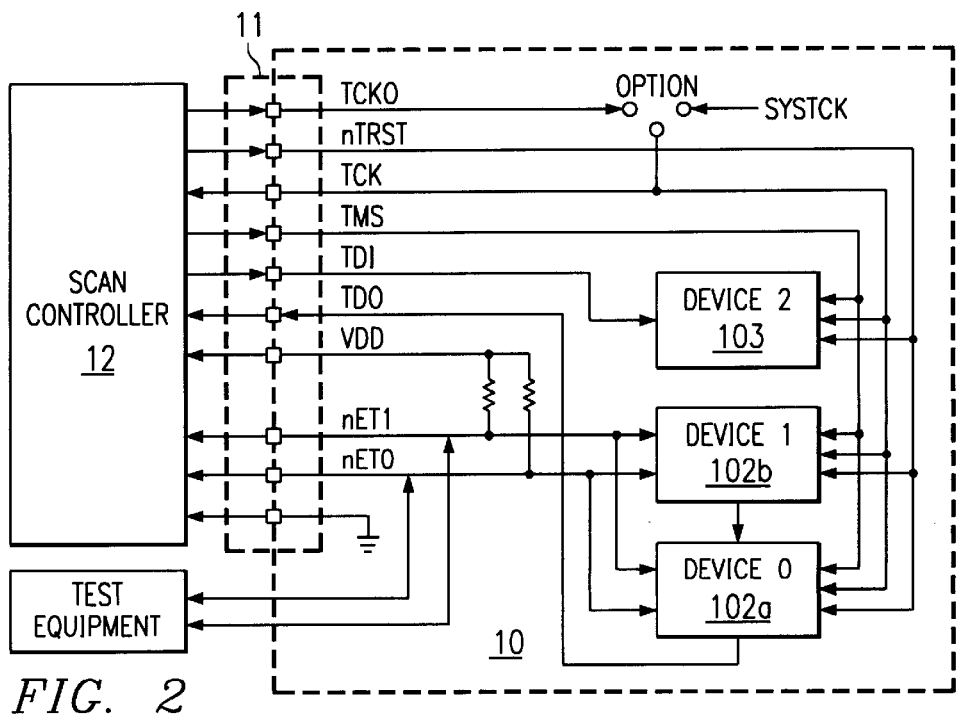
FIG. 2 is a block diagram illustrating an emulation system connected to several modules within the target device of FIG. 1.

The example system in FIG. 2 shows the system connectivity necessary for debug with multiple CPUs in multiple devices. This diagram omits signal buffering and other electrical considerations necessary to create a functional system. In this example, module 102a and module 102b contain CPU cores while module 103 does not. The three modules share a parallel connection to signals nTRST, TCK, and TMS. The scan path begins at the connector which provide JTAG interface 11 with signal TDI, enters module 103, passes through module 102b, and exits module 102a, ending as TDO back at the connector. Connections between module 1 and module 0 nET1 and nET0 create trigger channels one and zero.

Scan Controller 12 supplies VDD (Power), GND (Ground), and TCK to the connector. Scan controller 12 accommodates the system generation of (SYSTCK) or scan controller generation (TCKO) of TCK.

The multiprocessing debug environment requires a multitasking operating system on Host 13. Using the multitasking OS framework allows multiple single processor debuggers to be spawned as separate tasks by a global debugger shell. This creates an environment that allows the user to manipulate each processor individually via the single processor debuggers in individual windows or control processors globally via the global execution control directives which are part of the global debugger shell, as described in U.S. Pat. No. 5,828,824.

The state of the TRST-, EMU0, and EMU1 signals at device power-up (i.e. the rising edge of the RESET input) determine the device operating mode of the device, as described in Table 1—Device Operating Modes. Some of these modes are reserved for test purposes, but those which may be of use in a target system are detailed below. It is not required that a target system support any mode other than NORMAL, although SLAVE mode may be needed when using a device as a peripheral.

TABLE 1

Device Operating Modes

| TRST- | EMU1 | EMU0 | Device Operation Mode | JTAG Connected? |
|---|---|---|---|---|
| Low | Low | Low | SLAVE mode - disables CPU and memory portions of target device 10. Another processor treats device as a peripheral. | No |
| Low | Low | High | HI-Z mode - forces all device output pins to the high impedance state. | No |
| Low | High | Low | Wait-In-Reset mode - prolongs the device's reset until released by JTAG scan operations. This allows a normal target device to power-up in reset, provided external hardware holds EMU0 low only while power-up reset is active. | Yes |
| Low | High | High | NORMAL mode with emulation disabled. This is the setting that should be used on target systems when a scan controller (such as the XDS-510) is not attached. Note that TRST- will be pulled down and EMU1/EMU0 pulled up with-in the target device, so this is the default mode. | Yes |
| High | X | X | NORMAL mode with emulation enabled. This is the setting to use on target systems when a scan controller is attached (the scan controller will control TRST-). Note that TRST- should not be high during device power-up. | Yes |

The following definitions will help the reader to understand the information in the rest of this application:

Background code. The body of code that can be halted during debugging because it is not time-critical.

Foreground code. The code of time-critical interrupt service routines, which are executed even when background code is halted.

Debug-halt state. The state in which the device does not execute background code.

Time-critical interrupt. An interrupt that must be serviced even when background code is halted. For example, a time-critical interrupt might service a motor controller or a high-speed timer.

Debug event. An action, such as the decoding of a software breakpoint instruction, the occurrence of an analysis breakpoint/watchpoint, or a request from a host processor that can result in special debug behavior, such as halting the device or pulsing one of the signals EMU0 or EMU1.

Break event. A debug event that causes the device to enter the debug-halt state.

A user of emulation system 14 has the option of selecting two forms of control over target processor 10's execution of code: stop mode and real-time mode. Stop mode halts execution of all code whereas real-time mode allows selected interrupt service routines (ISRs) to be performed while execution of background code is halted. Background code refers to the main body of code which is generally not as time-critical as the interrupt routines which service motor controls or high-speed timers, for example. Real-time mode provides for the debug of code that interacts with interrupts that cannot be disabled. Stop mode provides complete control of program execution, allowing for the disabling all interrupts (including those which are non-maskable) and reset. Both execution modes can suspend program execution at debug events, such as:

software breakpoint instructions specified program or data accesses (i.e. analysis breakpoints or watchpoints)

when test host 13 or external hardware requests it

Real-time Debug Mode

Real-time debug allows for the suspension of background program execution at break events while continuing to service time-critical interrupts (also referred to as foreground code). Program execution can actually be suspended in multiple locations—under certain circumstances it is advantageous to break within one time critical interrupt service routine while still allowing others to be serviced.

The suspension of execution is similar to the execution of an IDLE instruction. An instruction pipeline within target device 10 flushes as instruction decode stops and all current pipeline activity completes. Interrupts can restart execution, but after the interrupt service routine is complete, the device returns to the suspended state (this differs from IDLE—after servicing an interrupt the device does not typically return to the IDLE state). When suspended, a debug interrupt enable register (DBGIER) is used in addition to a standard interrupt enable register (IER) to qualify pending interrupts. Interrupts must be enabled by both masks to interrupt the CPU when it is suspended, however, a global interrupt enable flag (INTM) is ignored. Suspending execution will add only one cycle to interrupt latency.

The DBGIER register serves to indicate what interrupts are time-critical. When a time-critical hardware interrupt is taken, a high priority interrupt active bit (HPI) in debug status register (DBGSTAT) is enabled (it's previous value is saved on the stack in the status word DBGSTAT). HPI will be cleared when the last time-critical interrupt service routine completes and it's previous DBGSTAT is popped off the stack. HPI is used to indicate whether certain break events should be performed. Note that HPI will be set whenever an interrupt enabled in the DBGIER register is taken—not just when execution was suspended. It will not be set by an INTR instruction which corresponds to an interrupt set in DBGIER.

Stop Mode Execution Control

Stop mode causes break events to suspend program execution at the next interrupt boundary, which is generally identical to the next instruction boundary. When execution is suspended, all interrupts (including reset and non-maskable interrupts). are ignored until the CPU receives a debug run directive. Stop mode can be thought of as similar to real-time mode, except that no interrupts are considered time-critical (i.e., all code is background code). Should an interrupt occur simultaneously with a debug event, the debug event has priority. However, once the processing of an interrupt has begun, target device 10 can not process a debug event until the first instruction boundary following one of these events.

Figure 3:
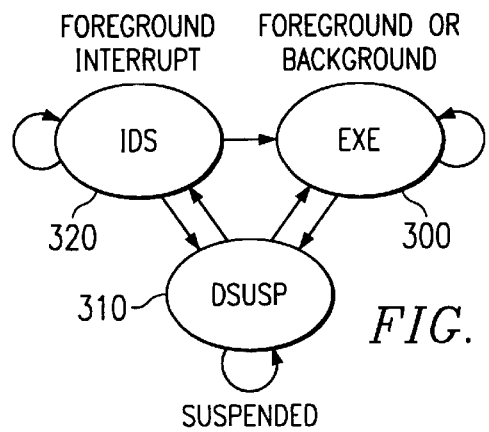
FIG. 3 is a state diagram illustrating real-time mode execution states.

FIG. 3 is a state diagram illustrating real-time mode execution states. There are three or more execution real-time execution states. These states are implemented by an Execute State Machine (ESM) within emulation circuitry of core processor 15. For this embodiment, there are three states defined: Execute (EXE) 300, Debug Suspend (DSUSP) 310, and Interrupt During Debug Suspend (IDS) 320. EXE state 300 represents code being executed on target device 10 with no outstanding stop conditions.

Two of these states, execute 300 and debug suspend 310, are also used when in stop mode. IDS 320 cannot be entered from DSUSP state 310 during stop mode debug.

Debug Architecture Embodiment

An embodiment of the present invention is referred to as ICEMaker.™ This architecture creates a set of capability that enables sophisticated system debug and test. This debug architecture, composed of several building blocks, provides a scaleable set of capability. The building blocks have both mandatory and optional components. The mandatory components cannot be excluded from a building block. A building blocks descriptions identify capability as mandatory or optional.

Building blocks are architecture independent. Most if not all building blocks require a wrapper to connect them to other CPU components. For instance, many of the registers used for debug are memory mapped. The register is in the generic component while the placement of the register in the memory map and the logic needed to read the register is in the wrapper. Models for the generic component can be easily ported from design to design, modulated to optimize bus widths when required.

Figure 4:
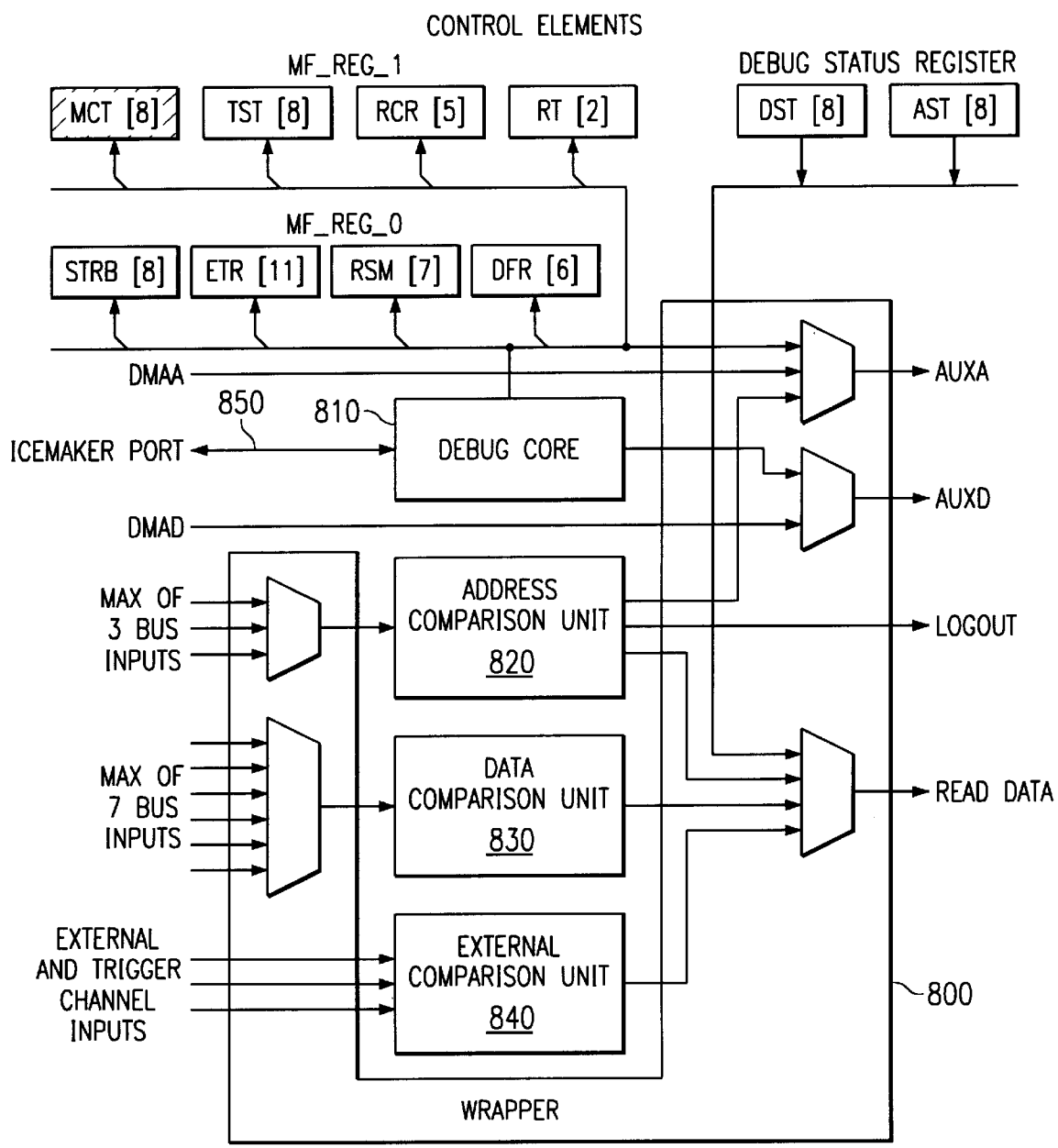
FIG. 4 is a block diagram of an embodiment of emulation circuitry according to the present invention.

FIG. 4 is a block diagram of an embodiment of emulation circuitry according to the present invention, the ICEMaker Unit (IMU) architecture showing both the fixed and variable portions of the components. The wrapper portion 800 of the ICEMaker function is device specific, completing the creation of specified ICEMaker functions by adapting the standard architecturally independent portion of the function to a specific CPU architecture. Debug core 810 contains all components necessary for interacting with a test host. Other ICEMaker building blocks are listed in Table 2.

TABLE 2

ICEMaker Building Blocks

| | |
|---|---|
| Debug Core 810 | The capability required to create a debug tool according to aspects of the present invention |
| Address Comparison Unit 820 | Provides event, break, data logging, PSA, and counter functions |
| Data Comparison Unit 830 | Provides event, break and PSA and counter functions |
| External Comparison Unit 840 | Provides break functions for external and trigger channel inputs |
| Control Elements 860 | Specific components such as trigger channel or execution control |

Figure 5:
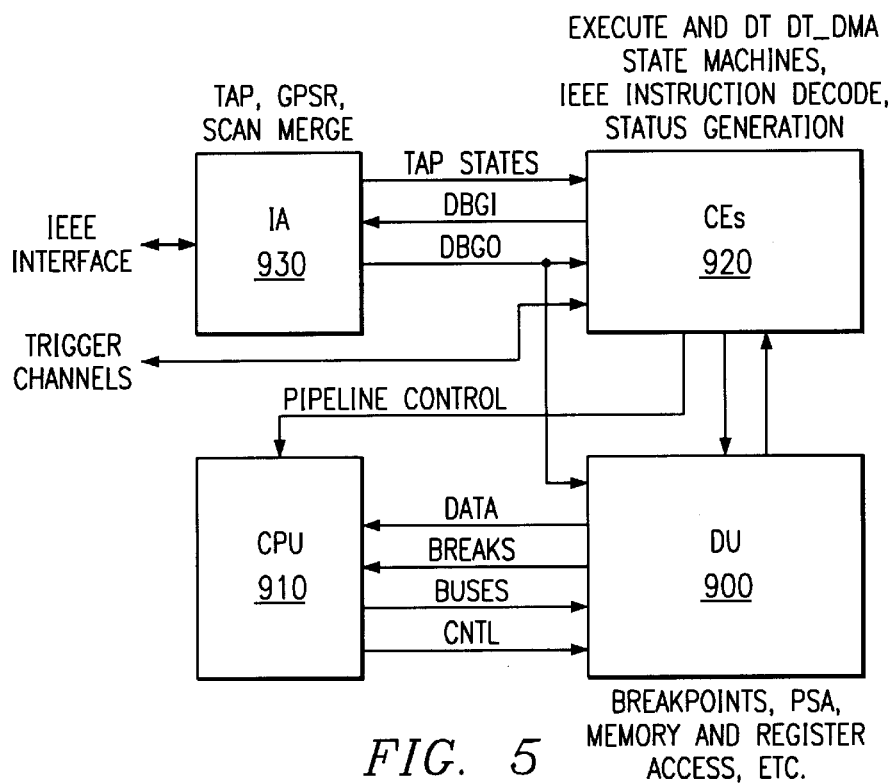
FIG. 5 is a block diagram of the debug core of FIG. 4.

FIG. 5 is a block diagram illustrating the functional partitioning of the IMU. Debug unit 900 provides a connection to core CPU 910 buses and pipeline. This unit also contains the debug registers such as ACU 820, DCU 830, and ECU 840 used to access CPU registers and memory. CEs 920 are a collection of control functions for DU logic and registers and other blocks such as CPU execution control. Interface adaptor (IA) 930 provides a bridge between the IEEE scan and test access port activity (TAP) at ICEMaker port and the CE/DU logic.

The IA is a generic function and is CPU core independent. This capability includes a IEEE 1149.1 Test Access Port (TAP), very basic scan capability, and the TDO output management. Interface adapter 930 supplies glitch free decoded tap signals to the remainder of the system including ASIC logic external to the CPU MegaModule. System logic external to the CPU MegaModule can use IEEE op-codes allocated to system functions to create customized IEEE functions such a boundary scan or similar capability. The 38 bit instruction register value provides numerous unused op-code groups that can be used in other parts of a design. This allows ASIC modules to share the use of the Mega-Module IEEE scan and TAP facilities.

A 38-bit scan path consisting of a 6 bit extended shift register (EXSR) and 32 bit general purpose shift register (GPSR) creates the IA's instruction scan path. The GPSR Supplies a 32 bit data value while the EXSR identifies the instruction class (op-code). Data scans use the 32 bit GPSR in several configurations. The EXSR forms a six bit counter for data scans, creating markers for specialized transfers. This counter, coupled with special GPSR scan path configuration, provides extremely high bandwidth production test upload and download sequences, receiving data four bits at a time from the TDI_i, TDO_i, nET1_i, and, nET0_i terminals or transmitting data four bits at a time from the TDI_o, TDO_o, nET1_o, and nET0_o terminals for uploads.

The CEs 920 block contains a number of state machines and the combinatorial logic necessary to manage debug functions. The CE logic includes all debug control needed to manage the DU function. This includes state machines and combinatorial logic needed to manage capabilities such as breakpoints, counters, benchmarking, and data logging. This block defines IEEE op-code usage and scan paths subject to guidelines established in this document. CE logic supplies synchronization between TCK and FCK logic. Since there are number of varied CE components, modeling them separately allows optimum physical placement within the Mega-Module.

The CE functionality includes but is not limited to:
IEEE instruction register controls;
IEEE instruction register decode;
Synchronization between the TCK and FCK clock domains;
Status acquisition;
Scan framework;
CPU execution control;
DMA control;
Debug memory read and write control;
Event generation logic;
Miscellaneous DU control; and
Trigger channels.

Debug Unit (DU) 900 is the debug and test connection to the CPU 910 data path. It is tightly coupled to the CPU and its buses. The DU functionality is portable to varied architectures but tailored to match CPU address and data bus widths. Since it connects to most of the CPU data path, it is logical that the CPU datapath includes the DU. Its functionality includes: memory access; register access; multiple breakpoints; benchmarking and event counting facilities; timers; data logging; DMA address and data management; communication register; CPU Core Signature Analysis, user definable signature analysis, and expedited test load/unload.

A combination of DU and CE logic provides access to CPU registers and memory. The DU provides a dual interface, scannable and memory mapped, to debug facilities such as breakpoints, benchmarking, data logging, and PSAS.

Figure 6:
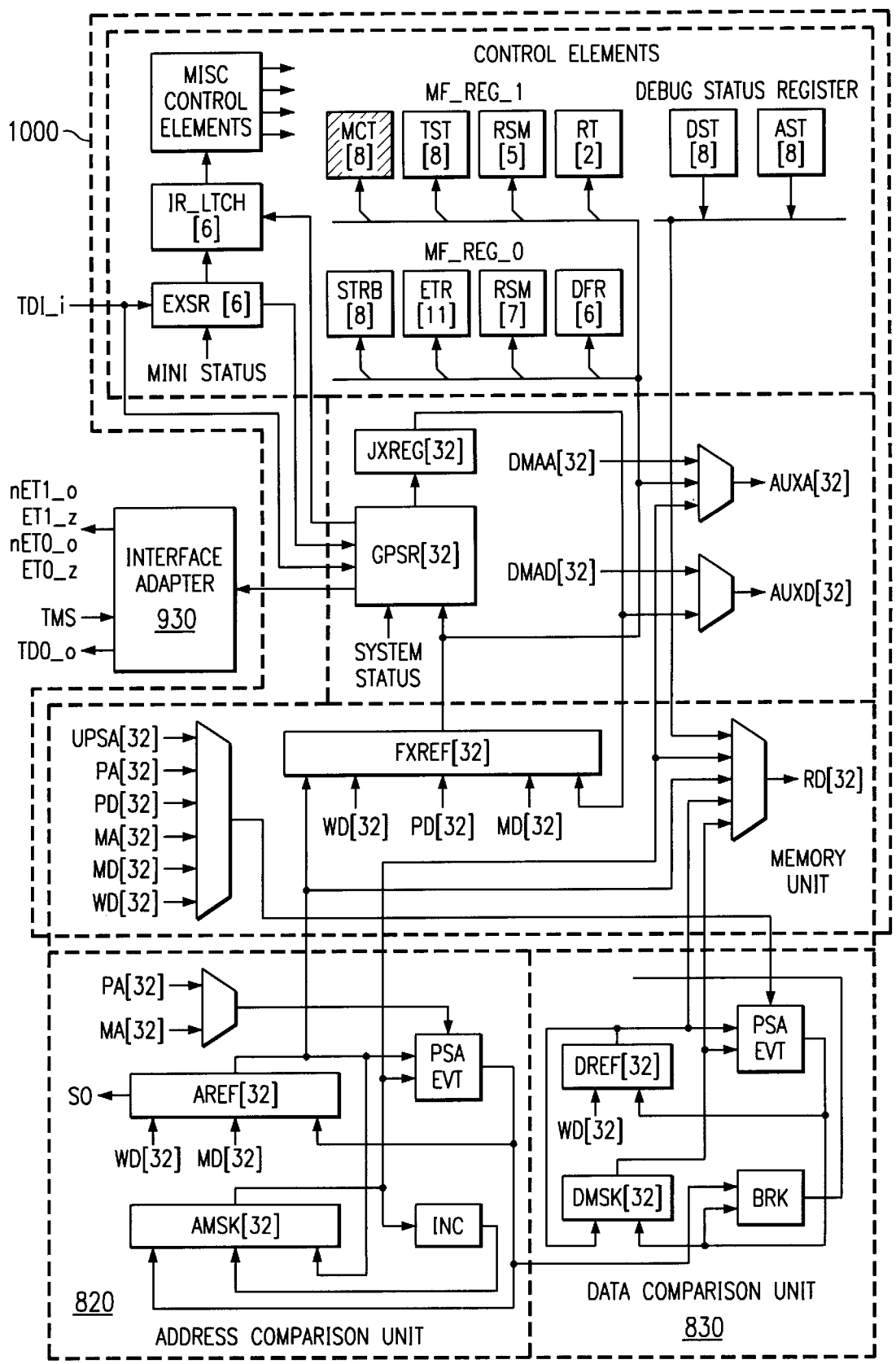
FIG. 6 a more detailed block diagram of the emulation circuitry of FIG. 4.

FIG. 6 a more detailed block diagram of the emulation circuitry of FIG. 4. The IMU contains three large blocks of logic as shown. These blocks are the Memory Unit (MU) 1000, Address Comparison Unit (ACU) 820 and Data Comparison Unit (DCU) 830. The units are the backbone of the IMU and comprise the Debug Unit (DU). Control elements (CEs) 1010 support the DU and provide control functions for it. These elements include the ACU 820, DCU 830 and ECU (External Control Unit) 840 control registers, not shown in FIG. 6. The MU provides the basic debug access to memory and registers for execution control. Most if not all miscellaneous register functions and control bits reside in this function. The ACU provides Breakpoint, Counter, PSA and Data Logging support. The DCU provides Breakpoint and PSA support. A third small unit, the ECU controls external inputs to the event functions.

ICEMaker Port 850 provides the interface to all CPU MegaModule scan paths. All instruction and data scan paths of the MegaModule involve the memory unit. Two registers, a 32 bit General Purpose Shift Register (GPSR) and a six bit Extension Shift Register (EXSR) combine to provide support for all instruction and data scan paths.

The GPSR scans during instruction and data scans. The EXSR scans during instruction scans and reconfigures as part of a six bit counter during data scans. This is practical as the EXSR is not part of any data scan string. The CAPTURE_IR state loads both registers, the GPSR with the contents of either the FXREG or system status and the EXSR with a mini status. The mini status defines the contents of the GPSR one of several data forms.

The LD_REGS_0, and LD_REGS_1 instruction classes can load debug control registers within the IMU (MFREGS_0 and MF_REGS_1) or just retrieve read data or system status. The load of these registers occurs when the IDLE state immediately follows an instruction scan defining these classes (an instruction scan ending in IDLE). The 32 bit data field accompanying the op-code class designation provides the data used to load the MF_REGS_0 and MR REGS_1 registers. These registers partition into segments that are individually loadable. Bits imbedded in the 32 bit data field control the load of specific register segments in both the MF_REGS_1 and MF_REGS_0 registers. In other words, the 32 bit data value contains both the register segment data and register segment load enables.

The MF_REGS_0 and MF_REGS_1 registers are in the FCK domain. Data is first loaded into the JXREG by the JTAG Update_IR state or its equivalent. The JTAG state transition from the UPDATE_IR the IDLE state (accompanied by the MF_REGS_0 or MF_REGS_1 op-code initiates the transfer. Previously loaded JXREG data that has not been dispositioned (used) blocks the load of new JXREG data. Data moves from the JXREG to the FXREG where it moves to the enabled register segments, or, in the case of MF_REGS_1, generates strobes. Consequently, loading of the MF REGS_1 and MF_REGS 0 segments inhibits changing the JXREG, FXREG and instruction (IR_LTCH) registers until the transfer completes. These registers can be loaded by the application when the special monitor mode is enabled at the MegaModule boundary. An assembly language register write instruction first writes the data into the FXREG. From there it is moved to the appropriate register. The application sees the MF_REGS_0 and MF_REGS_1 registers in the memory map. A write to either register first writes the data into the FXREG. From there it is moved to the appropriate register just as with scannable scenario. The write to the FXREG is transparent to the application software.

Table 3 shows the strobes that can be generated by writing to the MF_REG_0 register. A one in any bit position creates the specified action while a zero creates no action. Table 4 contains a brief description of the MF_REGS_0 segments. Table 5 contains a brief description of the MF_REGS_1 segments. Table 6 describes the individual bits in the MCT register segment, while Table 7 describes the test segment bits. The reset control register segment, shown in Table 8, provides reset modes for the CPU MegaModule. The real-time segment, shown in Table 9, provides reset modes for the CPU MegaModule.

TABLE 3

MF_REG_0 Generated Strobes

| Bit | Mnemonic | Type | Description |
| --- | --- | --- | --- |
| 31 | CMD_ERR | FS | Initialize command error |
| 30 | INIT_DFC | FS | Initialize DFC to all ones. |
| 29 | IDLE_FLAG | FS | Clear Idle flag |
| 28 | NF_SUSP | FS | Clear new frame suspend |
| 27 | TF_SUSP | FS | Clear target frame suspend |
| 26 | SYNC_ERR | FS | Clear synchronization loss |
| 25:24 | Reserved | | |

TABLE 4

Miscellaneous Function Register Zero Segments

| Segment | #Bits | Description |
| --- | --- | --- |
| Strobes | 8 | Strobes |
| ETR | 11 | Emulation and Test Pin Control - Defines the ET pin operating modes. This field supports a five bit control mechanism for each ETx pin plus a one bit segment select. |
| RSM | 7 | Run State Machine - This register segment is the run state machine. This field supports a 5 bit RSM with two segment selects. The first qualifies the load of the segment and the second qualifies the load of the segment based on the CPU running or halted. |
| DFR | 6 | Debug Frame Register - Defines the debug frame. This field supports a one bit segment select and a maximum DFR of 6 bits |

TABLE 5

Miscellaneous Function Register One Segments

| Segment | # of Bits | Description |
| --- | --- | --- |
| MCT | 8 | MU Cycle Type Register - Defines the qualification (High priority and rudeness level for accesses generated by the memory unit. This segment contains a seven bit register and a one bit segment select. This register segment is not implemented when the 7 bit data value generated by this register segment can be concatenated with the address and the total number of bits be less than or equal to 32 as shown in FIG. 5-5. |
| Reserved | 9 | Reserved |
| TST | 8 | Test Register- Defines the test modes or clock source This segment contains a six bit register and a one bit segment select. |
| RCR | 5 | Reset Control Register - Defines reset modes and capabilities. This segment contains a four bit register and a one bit segment select |
| RT | 2 | Real-time - This register segment contains the real-time bit and a one bit segment select. |

TABLE 6

MCT Segment Description

| Bit Name | Bit # | Description |
| --- | --- | --- |
| MCTEN | 31 | MCT Enable - MCT segment enable |
| NOID | 30 | No ID - This bit, when a one, causes the MU access to not be qualified by the DFC and DFR comparison. When this bit is a zero, the DFC and DFR comparison qualifies the MU access request. (No match is no request.) |
| MUHP | 29 | MU High Priority - Memory unit access high priority. When a one, the memory unit access request is high priority. When a zero the access request is low priority.. |
| MHPIU | 28 | MU DBG qualifier - When this bit is a one, the status register HPI bit has no influence on a MU access request. When a zero, the status register HPI bit must be a zero to generate a MU access request. |
| MDBGU | 27 | MU DBG qualifier - When this bit is a one, the status register DBGM bit has no influence on a MU access request. When a zero, the status register DBGM bit must be a one to generate a MU access request. |
| CYC[2:0] | 26:24 | Cycle Type - Forms the three cycle code bits for MU cycles. |

TABLE 7

TST Segment Description

| Bit Name | Bit # | Description |
| --- | --- | --- |
| TSTEN | 23 | Test Segment Enable - This bit, when a one, allows the remainder of the test segment to load from the FXREG. When this bit is a zero, the TEST segment. |
| CKSRC[1:0] | 22:21 | Clock Source - This field selects a MegaModule clock source for the functional logic.<br>00 - Functional clock 0<br>01 - Functional clock 1<br>10 - Test clock<br>11 - Test clock divided by two |
| TSTMAP | 20 | Test Map - Switch the memory map to the test configuration when this bit is a one. Use the normal memory map when a zero. |
| ISOLATE | 19 | Isolate - Disconnect the CPU MegaModule inputs when this bit is a one, supplying alternate inputs from the MegaModule. MegaModule generated stimuli connect to these inputs. Use the normal CPU MegaModule inputs when this bit is a zero. |
| Reserved | 18:16 | Reserved |

TABLE 8

RCR Segment Description

| Bit Name | Bit # | Description |
| --- | --- | --- |
| RCREN | 15 | Test Segment Enable - This bit, when a one, allows the remainder of the test segment to load from the FXREG. When this bit is a zero, the RCR segment does not load. |
| RES_SET | 14 | Reset Set - Set the Res_Ltch when this bit is a one. Do nothing when this bit is a zero. The reset disconnect function does not affect the function of this bit. The generation of reset by this bit. |
| RES_CLR | 13 | Reset Clear - Attempt to clear the Res_Ltch when this bit is a one. |
| RES_DIS | 12 | Reset Disconnect - Disconnect the SE and system resets from the Res_Ltch when this bit is a one. Connect these resets when this bit is a zero. |
| RES_STAY | 11 | Reset Stay - Set the Res_Stay bit to the value of this bit. The reset stay bit, when a one stretches an incoming reset indefinitely until this bit is set to a zero. |

TABLE 9

RT Segment Description

| Bit Name | Bit # | Description |
| --- | --- | --- |
| RTEN | 15 | Real-time Segment Enable - This bit, when a one, allows the remainder of the real-time segment to load from the FXREG. When this bit is a zero, the real-time segment does not load. |
| RT | 14 | Real-time - This bit, when a one, places the CPU in real-time mode. When a zero it places the device in stop mode. |

The LD_DMA_WD instruction loads the JXREG with the data in the data field of the instruction for use as write data by the internal DMA. When the DMA is activated to do writes originating from the JTAG block, it uses this data to generate a memory writes. DMA notification of data available occurs provided the instruction scan passes directly from the Update_IR state to the IDLE state and JXREG load of the write data was not blocked by a busy condition. When the DMA is not activated it hangs the interface. Table 5–14 shows the LD_DMA_WD instruction format.

Debug software can use two mechanisms to get to system resources. This instruction directly supports one of them, the MU option. The memory unit (MU) provides register set (an address register and write data register) that debug software loads for each access. The address register doubles as the read data input register. Once the read is initiated, the address is no longer needed so this does not present a problem. The address register is loaded through the write data register. Debug software provides the address for each read access and initiates the read access with a single instruction scan. It must end in the IDLE state, passing directly from the Update_IR to the IDLE state to load the address.

A second read option, indirectly supported by this instruction, requires the address comparison unit (ACU) to supplement the MU registers with auto incrementing address generation. Debug software allocates the ACU to breakpoints, PSA generation, timing and benchmarking features, and DMA address generation. During data logging the application uses the ACU DMA facilities while production tests use the DMA facilities to expedite test down loads. Because of the multifunction aspects of the ACU, it is not generally used for low bandwidth transfers.

The SYS_ACC_W instruction directly supports. the debug software's ability to generate write accesses using the memory unit (MU) resources. The memory unit (MU) provides register set (an address register and write data register) that debug software loads for each access. The address register is loaded through the write data register, necessitating the address register be loaded first. The load of these two registers uses the same instruction with different option fields. The instruction address size/type option is specified for the instruction scan that loads the address. This instruction scan loads the address register (FXREG) but does not initiate an access. It must end in the IDLE state to load the address. The second instruction scan uses one of the three data size type options. These options specify the data size. The underlying hardware combines the two LSBs of address with the size/type information to fully define the access. The second instruction scan must also end in IDLE. This instruction scan places the write data in the write register (JXREG).

The SYS_ACC_W instruction class provides directly for MU accesses. It indirectly supports the block transfer capability as MU writes can activate the ACU internal DMA. This gives debug access to block reads and writes using an auto-incrementing address mechanism in the ACU. Debug software defines the starting DMA address and activates the DMA (as opposed to the application doing it in data logging modes). Write(s) to the to the DMA address generator/word counter, activating the DMA ready the DMA for read and write transfers using the JXREG, the normal write data buffer.

The MU and ACU memory access mechanisms share a write data buffer but have separate read data buffers. This allows simultaneous reading from both mechanisms, read with one mechanism and write with the other. Writes can be interleaved by debug software but do not occur simultaneously (first one mechanism and then the other).

The test access instruction classes provides fast download (TEST_ACC_W) and upload (TEST_ACCR) of memory in the production test environment. Both of these instruction classes reconfigure the scan chain for data scans. This supplies four scan inputs for the TEST_ACC_R instruction and four scan outputs for the TEST_ACC_W instruction. TDI handles the most significant byte, TDO_o the next, nET1, the next, and nET0 the least significant byte for both reads and writes. The both reads and writes use the ACU address mechanism to do block transfers. Instruction scans ending in IDLE use the 32 bit data field of these two instructions to load the 16 LSBs of MF_REG_1 and the 16 bit ACNTL.

These instructions clear the AMSK, AREF, DCNTL, DMSK, DREF, and ECNTL registers when the ACNTL register is loaded. This allows reset to be applied, the clock source to be specified, and the initiation of internal DMA to occur simultaneously.

The JXREG sources the write data the writes, independent of the space defined by the ACNTL register. The FXREG receives all read data, from program memory, data memory and auxiliary spaces. For reads, the ACU issues continuous read requests. This continues until the DMA action terminates. A not ready condition occurs when the FXREG is loaded. Reading the FXREG data generates a ready for one clock and then the FXREG fills again. Since data scans export the read data, there is no mini status and a new word is exported every eight clocks. A nibble is output from the export pin set every TCK (every 5 ns at 200 MHz). Reaching the access limit specified by the word count or other halt mechanism ends the read requests. The cycles in the memory pipeline continue and the new read data moves to the FXREG as the FXREG empties into the GPSR. Eventually the memory pipeline completely empties and no new data is available. The EXSR counter loads the first word into the GPSR during the Capture_DR state and subsequently moves data from the FXREG to the GPSR every eight Shift_DR states after the initial capture state. The MF_REGS_1 load must apply reset to the CPU, and specify TCK/2 as the clock source.

Running through an example calculation, a TCK frequency of 200 MHz yield a functional clock frequency of 100 MHz. The 200 MHz TCK provides an input or output bandwidth of 800 Mbits/sec. A 1000 32 bit word test case. would take approximately 40 usec to load. Assuming the CPU takes on average two clocks per word to execute this program, the CPU takes approximately 20 us to complete the test execution. This makes the ratio of test load time to execution time approximately 2 to 1. This ratio is also valid for unload times.

This instruction provides for the generation of TCK based strobes that coincide with the duration of the IDLE state following an instruction'scan. It also provides high bandwidth transfers by allowing imbedded commands in a data scans.

This instruction provides for the initialization of miscellaneous error detects, in addition to providing for the initialization of the command interface. Since other instructions can request actions that cannot be completed, (i.e. the rudeness level of a memory access can be low enough that it is blocked), a mechanism to abort a request in progress is needed. This allows the debug interface to change the access criteria before trying again.

Table 10 lists all the debug related registers for ICEMaker. Miscellaneous control bits supporting the JTAG interface are not included in this list. Most but not all of the debug unit registers are placed in the memory map so they are accessible by both debug software and the application. There are three levels of register access: registers always shared by the application and debug facilities; registers accessed through the ICEMaker™ Port only; and registers accessed through the ICEMaker™ Port or a specially privileged monitor program but not shared.

The application and debug, software share registers controlling external trigger event inputs, breakpoints and watchpoints, data logging, PSA, and count functions. The application and debug software can not simultaneously own these resources but establish ownership and release ownership through memory mapped control registers continuously visible to both the application and debug software. The debug software has the ability to seize any resource if necessary, or negotiate with the application through software sequences.

Other registers are specific to JTAG scan support and can never be accessed by the application. This class of registers is clocked with TCK and includes the JXREG, GPSR. EXSR, and IR_LTCH registers. Another register, the MF_REGS_1 register is clocked with FCK but is not accessible to the application. This register controls the device execution mode (real-time and stop mode), special reset modes, test modes, clock source selection and the like. The application could get suicidal if granted access to this register.

A third class of registers is accessible through JTAG and accessible to the application if a special privileges are granted to a monitor function via a CPU MegaModule terminal (MON_PRIV). When this terminal is grounded the application cannot access this register class. When this terminal is a logic one, the application code can access a debug control register normally controlled by JTAG scans. This register contains ETx pin control, execution control, the debug frame reference register.

TABLE 10

Debug Register List

| Width | Memory Mapped | Register Name | Description |
|---|---|---|---|
| 8 | No | IR_LTCH | Latched Instruction Register |
| 6 | No | EXSR | Extended Shift Register |
| 32 | No | JXREG | JTAG Transfer Register |
| 32 | No | GPSR | General Purpose Shift Reg. |
| 32 | No** | FXREG | Functional Transfer Register |
| 32 | No | MF_REGS_1 | Misc. Function Register 1 |
| 32 | Yes | MF_REGS_0 | Misc. Function Register 0 |
| 16 | Yes | DBG_STATUS | Debug status |
| 16 | Yes | ECNTL | External Event Control |
| 16 | Yes | ACNTL | Address Unit Control |
| 32 | Yes | AMSK | Adrs. Mask Register |
| 32 | Yes | AREF | Adrs. Reference Register |
| 16 | Yes | DCNTL | Data Unit Control |
| 32 | Yes | DMSK | Data Mask Register |
| 32 | Yes | DREF | Data Reference Register |
| 16 | Yes | HPIR | High Priority Interrupt Reg. |

**Monitor privileged writes to MF_REG_0 use the FXREG as a temporary register.

Another embodiment of the present invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities. Note similar figure references in the following figures generally do not coincide with earlier figures.

Figure 7:
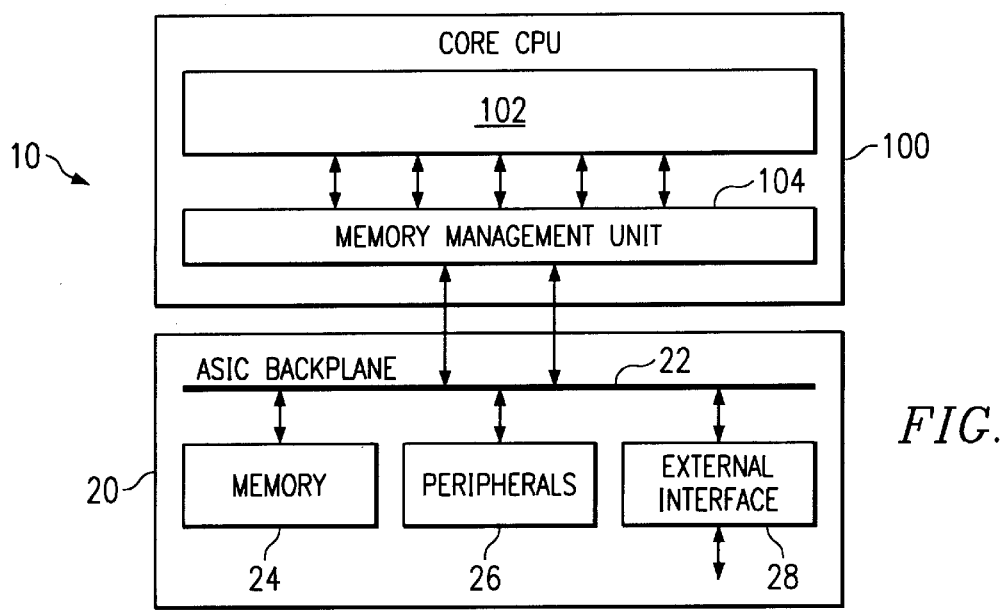
FIG. 7 is a schematic block diagram of a digital system which includes a microprocessor in accordance with an embodiment of the invention.

FIG. 7 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 7 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of microprocessor 100 relevant to an embodiment of the present invention are explained in sufficient detail herein below, so as to enable one of ordinary skill in the microprocessor art to make and use the invention.

As shown in FIG. 7, processor 100 forms a central processing unit (CPU) with a processor core 102 and a memory interface unit 104 for interfacing the processor core 102 with memory units external to the processor core 102.

Processor backplane 20 comprises a backplane bus 22, to which the memory management unit 104 of the processor is connected. Also connected to the backplane bus 22 is an instruction memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 8:
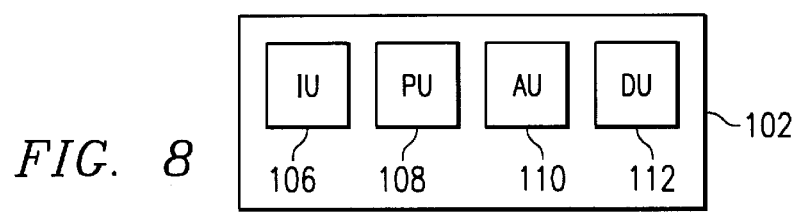
FIG. 8 is a schematic diagram of the processor core of FIG. 1.

FIG. 8 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 9:
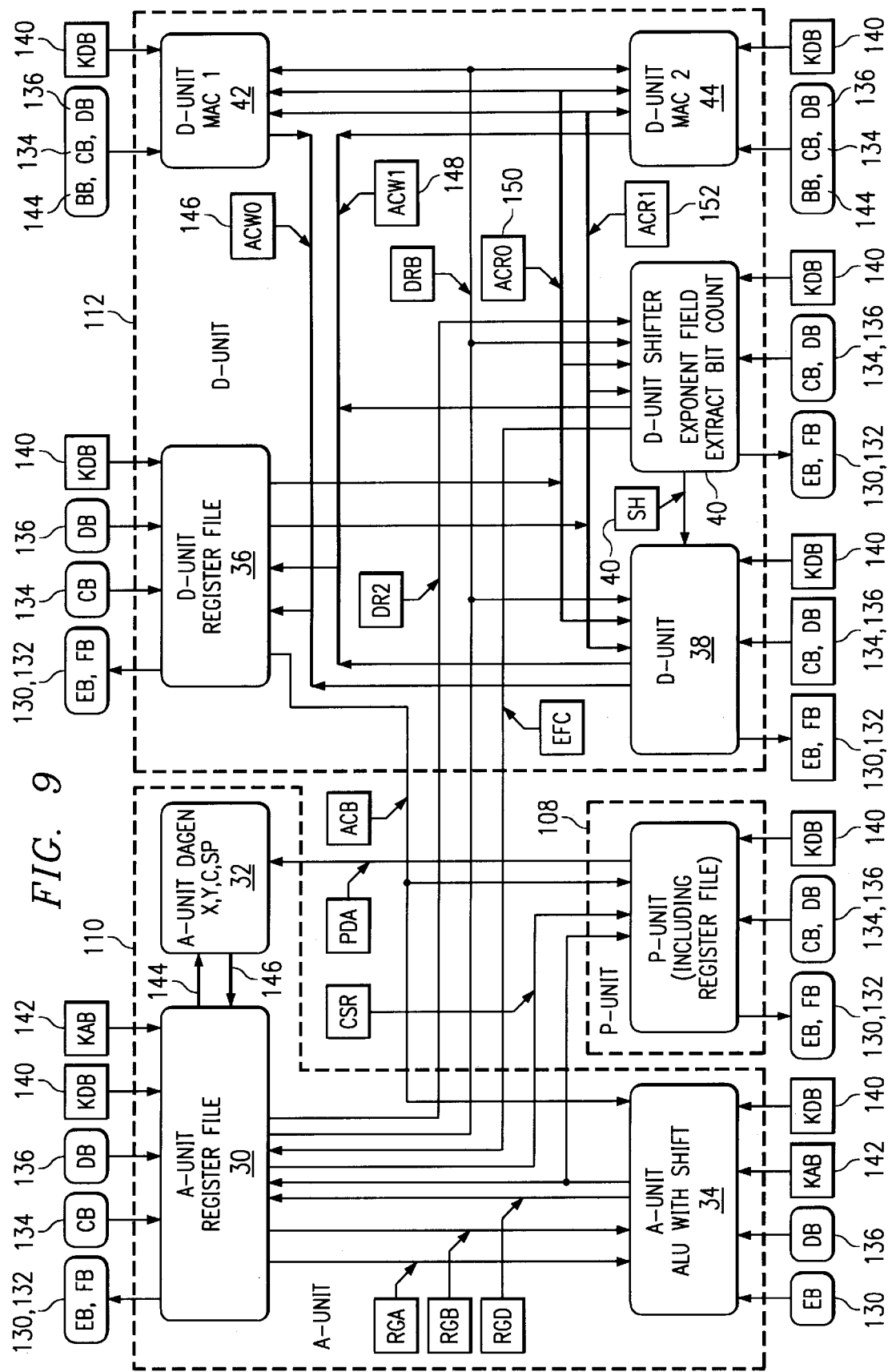
FIG. 9 is a more detailed schematic block diagram of various execution units of the processor core.

FIG. 9 illustrates P Unit 108, A Unit 110 and D Unit 112 of the processor core 102 in more detail and shows the bus structure connecting the various elements of the processor core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write buses (EB,FB) 130,132, Data Read buses (CB,DB) 134,136 and a coefficient program bus (BB) 138. Additionally, the P Unit 108 is coupled to sub-units within the A Unit 110 and D Unit 112 via various buses labeled CSR, ACB and RGD.

As illustrated in FIG. 9, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0, ..., AR7) and data registers (DR0, ..., DR3) which may also be used for data flow as well as address generation. Additionally, the register file includes 16 bit circular buffer registers and 7 bit data page registers. The general purpose buses (EB,FB,CB,DB) 130,132,134,136, as well as a coefficient data bus 140 and a coefficient address bus 142 are coupled to the A Unit register file 30. The A Unit register file 30 is coupled to the A Unit DAGEN unit 32 by unidirectional buses 144 and 146 respectively operating in opposite directions. The DAGEN unit 32 includes 16 bit X/Y registers and coefficient and stack pointer registers, for example for controlling and monitoring address generation within the processor 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit ALU is coupled to the Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to buses (EB, FB, CB, DB and KDB) 130, 132, 134, 136 and 140, and the MAC units 42 and 44 are coupled to the buses (CB, DB, KDB) 134, 136, 140 and Data Read bus (BB) 144. The D Unit register file 36 includes 40-bit accumulators (AC0, ..., AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to sub-units of the A Unit 108 via various buses labeled EFC, DRB, DR2 and ACB.

Figure 10:
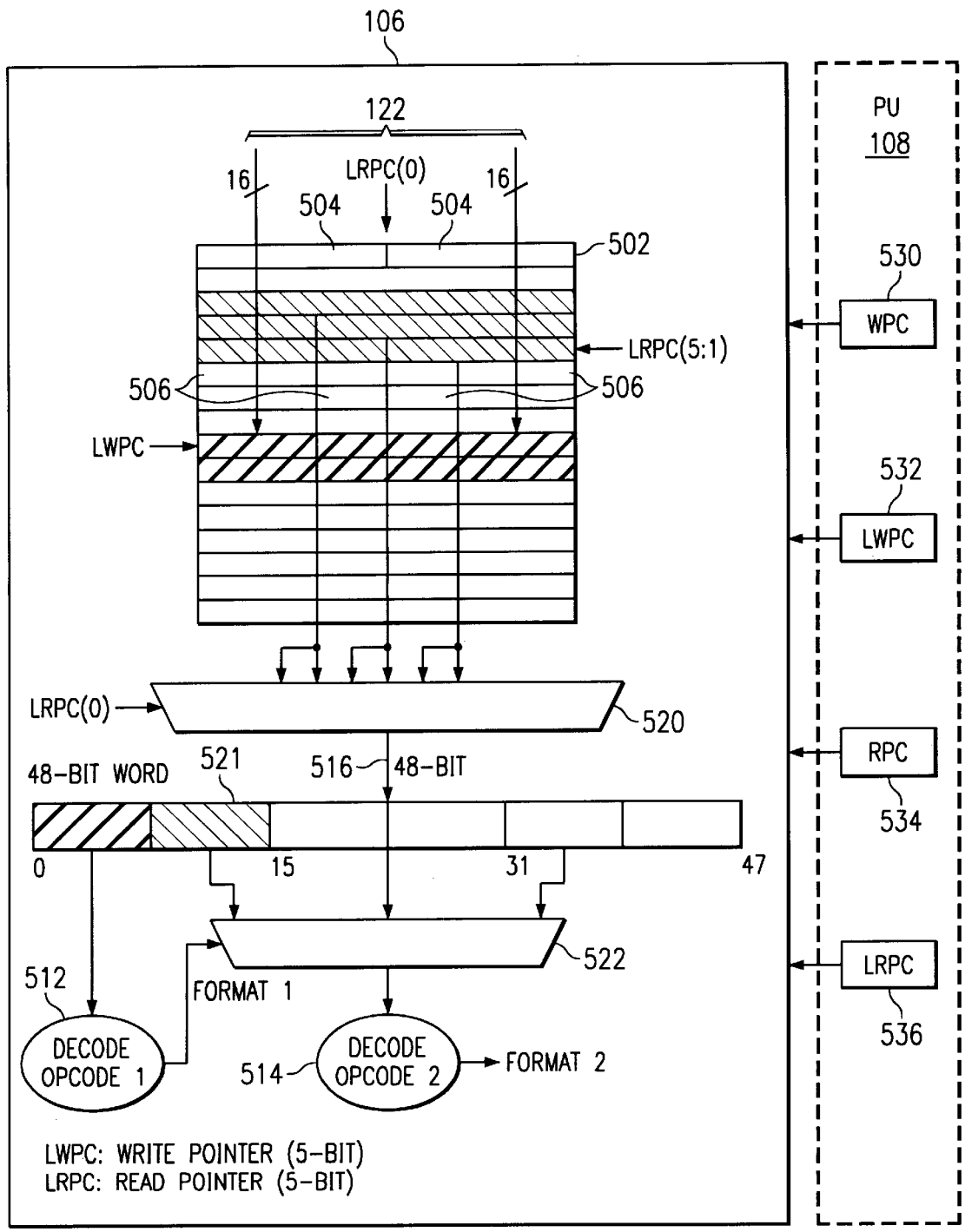
FIG. 10 is a schematic diagram of an instruction buffer queue and an instruction decoder of the processor.

Referring now to FIG. 10, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexers 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle for parallel execution. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexers 520 and 521.

Two instructions can be put in parallel if one of the two instructions is provided with a parallel enable bit. The hardware support for such type of parallelism is called the parallel enable mechanism. Likewise, two instructions can be put in parallel if both of the instructions make single data memory accesses (Smem, or dbl(lmem)) in indirect mode. The hardware support for such type of parallelism is called the soft dual mechanism.

Processor core 102 executes instructions through a 7 stage pipeline, the respective stages of which will now be described with reference to Table 11 and to FIG. 11. The processor instructions are executed through a seven stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 11

Processor Pipeline Operation for a
Single Cycle Instruction With No Memory Wait States

| Pipeline stage | | Description. |
|---|---|---|
| P0 | Pre-Fetch | Address program memory via the program address bus PB. |
| P1 | Fetch | Read program memory through the program bus PB. Fill instruction buffer queue with the 4 bytes fetched in program memory. |
| P2 | Decode | Read instruction buffer queue (6 bytes) Decode instruction pair or single instruction. Dispatch instructions on Program Flow Unit (PU), Address Data Flow Unit (AU), and Data Computation Unit (DU). |
| P3 | Address | Data address computation performed in the 3 address generators located in AU<br>- Pre-computation of address to be generated in<br>  - direct SP/DP relative addressing mode.<br>  - indirect addressing mode via pointer registers.<br>- Post-computation on pointer registers in<br>  - indirect addressing mode via pointer registers.<br>Program address computation for PC relative branching instructions: goto, call, switch. |
| P4 | Access | Read memory operand address generation on BAB, CAB, DAB buses. Read memory operand on CB bus (Ymem operand). |
| P5 | Read | Read memory operand on DB (Smem, Xmem operand), on CB and DB buses (Lmem operand), on BB (coeff operand) Write memory operand address generation on EAB and FAB buses. |
| P6 | Execute | Execute phase of data processing instructions executed in A unit and D unit. Write on FB bus (Ymem operand). Write Memory operand on EB (Smem, Xmem operand), on EB and FB buses (Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This, significantly improves the C compiler performance since no NOP's instructions have to be inserted to meet latency requirements. It also makes the code translation from a prior generation processor to a latter generation processor much easier.

A pipeline protection basic rule used in processor 100 is as follows: if a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 11. As can be seen from FIG. 11, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 11 for a seven-stage pipeline a total of 7 instructions may be processed simultaneously. For all 7 instructions 302–314, FIG. 11 shows them all under process in time period $T_7$. Such a structure adds a form of parallelism to the processing of instructions.

Figure 12:
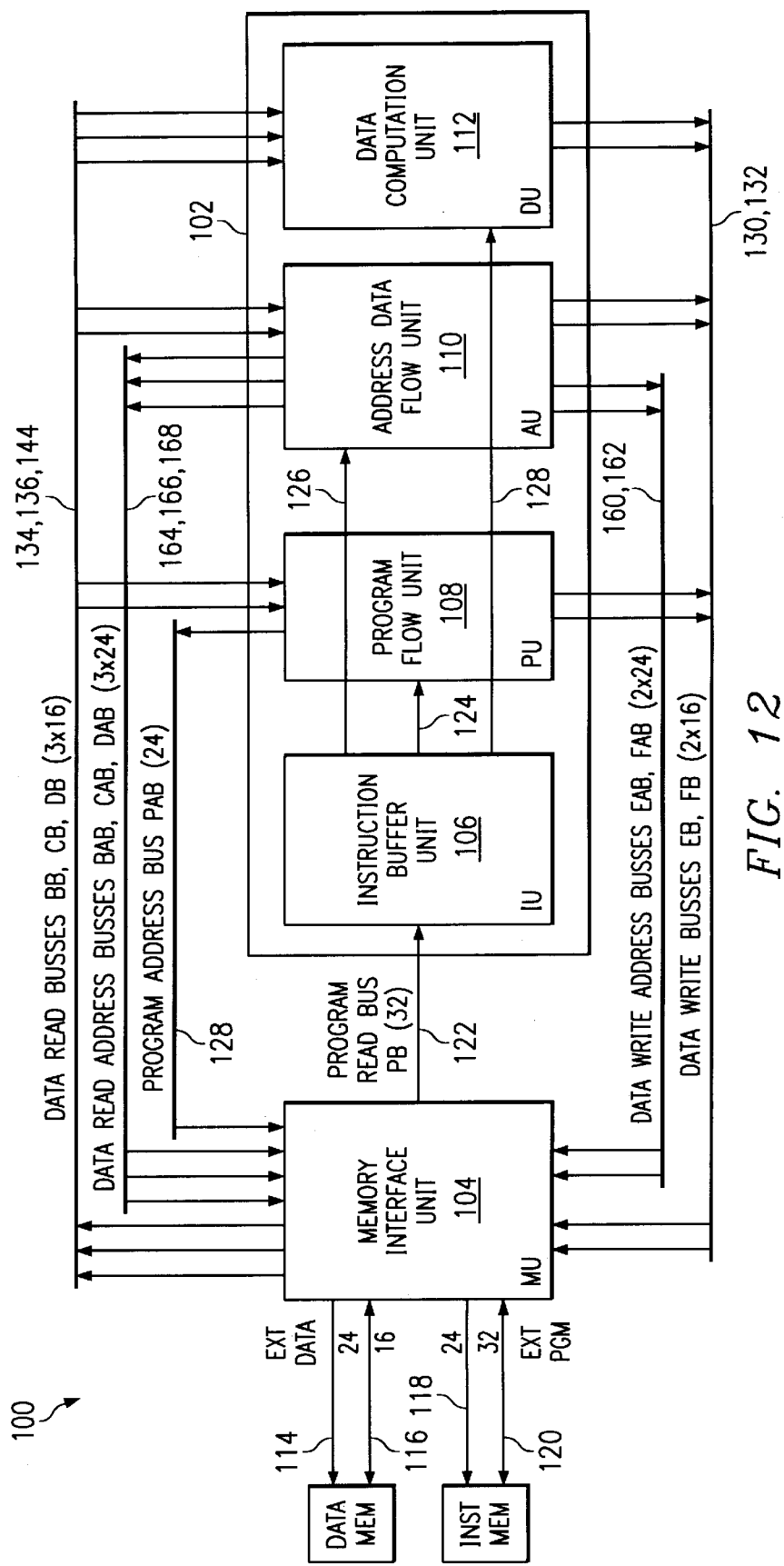

As shown in FIG. 12, the present embodiment of the invention includes a memory interface unit 104 which is coupled to external program storage memory 150 via a 24 bit address bus 118 and a 32 bit bi-directional data bus 120. Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

FIG. 12 represents the passing of instructions from the I Unit 106 to the P Unit 108 at 124, for forwarding branch instructions for example. Additionally, FIG. 12 represents the passing of data from the I Unit 106 to the A Unit 110 and the D Unit 112 at 126 and 128 respectively.

Figures 11, 13:
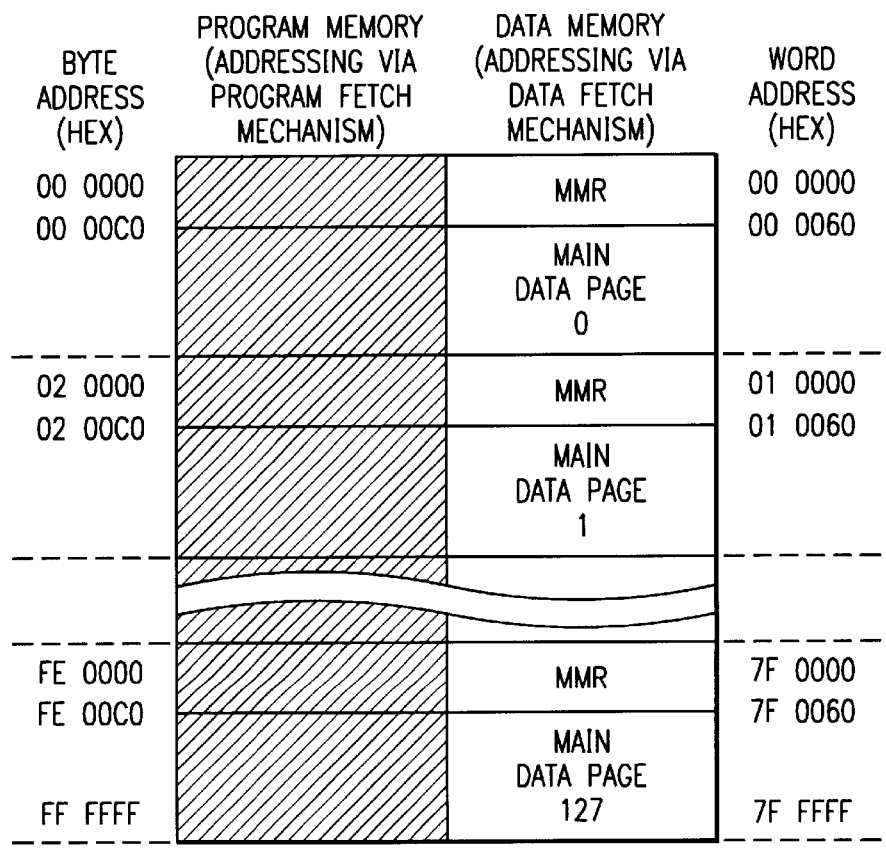
FIG. 11 is a schematic representation of the processor core for explaining the operation of the pipeline of the processor.
FIG. 13 shows the unified structure of Program and Data memory spaces of the processor.

Processor 100 is organized around a unified program/data space, as illustrated in FIG. 13. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability. Software can define up to 3 main data pages, as follows:

| MDP | Direct access | Indirect access | CDP |
|---|---|---|---|
| MDP05 | — | Indirect access | AR[0-5] |
| MDP67 | — | Indirect access | AR[6-7] |

A stack is maintained and always resides on main data page 0. CPU memory mapped registers are visible from all the pages.

Various aspects of processor 100 are summarized in Table 12.

TABLE 12

Summary of Improved Processor 100

Very Low Power programmable processor
Parallel execution of instructions, 8-bit to 48-bit instruction format
Seven stage pipeline (including pre-fetch)

| | |
|---|---|
| Instruction buffer unit highlight | 32x16 buffer size<br>Parallel Instruction dispatching<br>Local Loop |
| Data computation unit highlight | Four 40 bit generic (accumulator) registers<br>Single cycle 17x17 Multiplication-Accumulation (MAC)<br>40 bit ALU, "32 + 8" or "(2 × 16) + 8"<br>Special processing hardware for Viterbi functions<br>Barrel shifter |
| Program flow unit highlight | 32 bits/cycle program fetch bandwidth<br>24 bit program address<br>Hardware loop controllers (zero overhead loops)<br>Interruptible repeat loop function<br>Bit field test for conditional jump<br>Reduced overhead for program flow control |
| Data flow unit | Three address generators, with new addressing modes<br>Three 7 bit main data page registers |

TABLE 12-continued

Summary of Improved Processor 100

Very Low Power programmable processor
Parallel execution of instructions, 8-bit to 48-bit instruction format
Seven stage pipeline (including pre-fetch)

| | |
|---|---|
| highlight | Two Index registers<br>Eight 16 bit pointers<br>Dedicated 16 bit coefficients pointer<br>Four 16 bit generic registers<br>Three independent circular buffers<br>Pointers & registers swap<br>16 bits ALU with shift |
| Memory Interface highlight | Three 16 bit operands per cycle<br>32 bit program fetch per cycle<br>Easy interface with cache memories |
| C compiler Algebraic assembler | |

Figure 14:
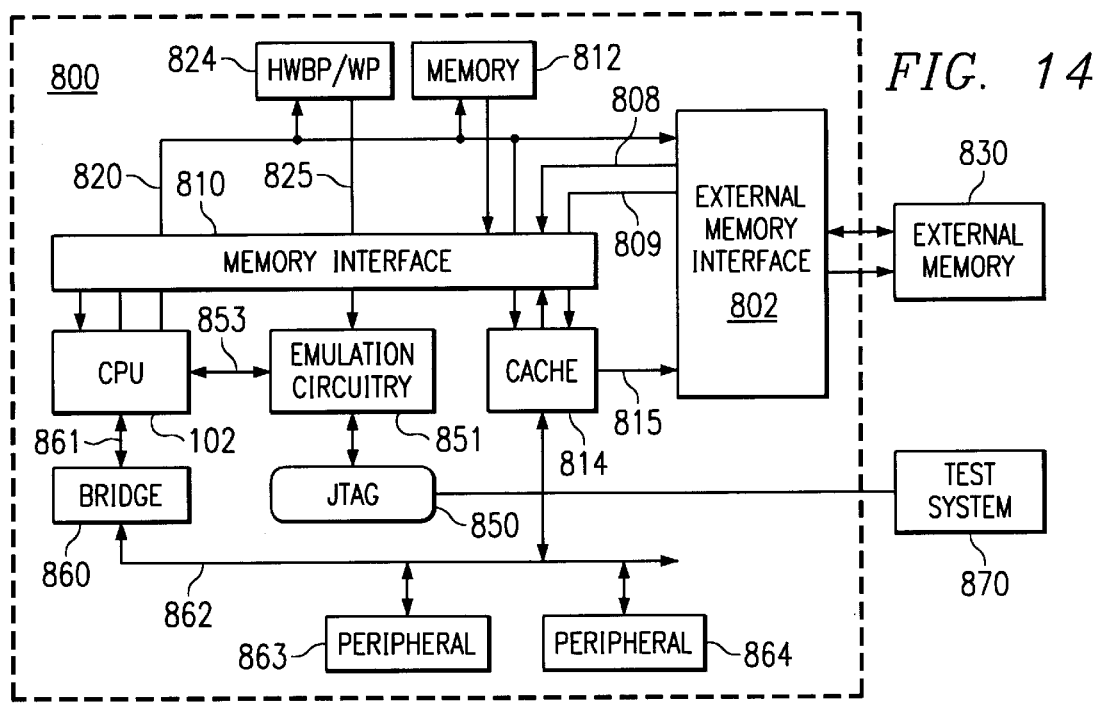
FIG. 14 is a block diagram illustrating a digital system with the processor of FIG. 1 and associated emulation circuitry, according to aspects of the present invention.

FIG. 14 is a block diagram illustrating a digital system 10 with the processor 100 and associated with benchmarking circuitry 852, according to aspects of the present invention. In this embodiment, several individual ASIC component cells are combined to form megacell 800 on a single integrated circuit. Processor core 102 is connected to memory interface 810. Instructions and data can be obtained from cache 814, internal memory 812, or external memory 830 via the external memory interface 802. Program fetch address bus 820 provides program counter addresses to cache 814 or memories 812, 830 in response to RPC 534 (see FIG. 11). The cache requests a program fetch from external memory 830 via bus 815 when a cache miss occurs. In this case, instruction data is provided to processor core 102 via bus 808 while the cache is updated via bus 809. Hardware breakpoint/window point circuitry 824 monitors address bus 820 and sends a window signal 825 to benchmark circuitry 852 when a pre-selected address or address range is detected. Emulation circuitry 851 provides access to the various components within megacell 800 via JTAG test port 850. Memory read and write requests can be conducted by the emulation circuitry across emulation bus 853 by sending a request to processor core 102.

An external host 870 test system is connected to test port 850 to control emulation and testing. External test system 870 is representative of a variety of known test systems for debugging and emulating integrated circuits which can be configured to take advantage of aspects of the present invention, as described with reference to FIG. 1. Another such system is described in U.S. Pat. No. 5,329,471, which was incorporated by reference.

JTAG interface 850 is an improvement on the structure of the IEEE 1149.1-1990 "Standard Test Access Port and Boundary Scan Architecture. Terms and concepts relating to IEEE 1149.1, which are used herein, are explained fully in this IEEE standard.

The IEEE 1149.1 standard provides a communication protocol that allows the selection of one or more devices imbedded within a system. This protocol implements the primitives necessary to control on-chip debug and test facilities. JTAG Debug interface 850 of the present invention adds two additional terminals (nET1 and nET0) to the five terminal version of the standard IEEE interface (nTRST, TCK, TMS, TDI, and TDO). Including nTRST in the debug interface definition simplifies system design as this terminal, when held LOW, generates an asynchronous reset to the test and debug logic of each device within the system. This guarantees normal system operation. This also eliminates the need for the system to provide a continuously running TCK.

Emulation circuitry 851 contains hardware extensions to the standard IEEE interface, providing more advanced debugging and production test features. Although the IEEE standard targets testing board or system level interconnect, extensions to its functionality can do much more. Four significant extensions add to the baseline IEEE function, as follows: debug facilities, multiple scan technologies, trigger channels through two additional terminals, and extended operating modes (EOMs), as described in U.S. Pat. No. 5,828,824—Method For Debugging An Integrated Circuit Using Extended Operating Modes, incorporated herein by reference.

Still referring to FIG. 14, bridge 860 connects to data bus 861 and provides a buffered data bus, Rbus 862. Peripherals 863 and 844 are representative of a variety of peripheral devices that may be connected to Rbus 862. Rbus 862 also connects to emulation circuitry 851 and to cache circuitry 814 in order to provide memory mapped access to non-CPU registers therein.

Table 13 lists memory mapped registers within processor core 102 that are relevant to an understanding of this embodiment of the present invention. These registers will be described in more detail in the following paragraphs. Processor core 102 also has a number of other memory mapped registers that are used for various control, status, and operational tasks. Table 14 describes bits within status/control register ST1 that are relevant to an understanding of the present invention, while Table 15 summarizes the bit assignments of status/control register ST3.

TABLE 13

Memory Mapped CPU Registers

| MMR Register | Word Address (Hex) | Register Description | Bit Field |
|---|---|---|---|
| ST1 | 07 | System control register | [15-00] |
| ST3 | 37 | System control register | [15-00] |

Emulation circuitry 851 implements the state machine described with reference to FIG. 3

TABLE 14

Status/Control Register ST1

| | |
|---|---|
| ABORTI | bit 13: Emulation control<br>ABORTI = 1 Indicates that an interrupt service routine (ISR) is not be returned from. This signal is exported to an emulation support module. This clears the IDS (interrupt during debug) and HPI (high priority interrupt) bits in the debug status register and resets the Debug Frame Counter. This causes the emulation software to disregard any and all outstanding debug states entered from high priority interrupts since the processor was stopped by an emulation event.<br>ABORTI = 0 Default operating mode<br>ABORTI is cleared at reset. |
| EALLOW | bit 14: Emulation access enable bit<br>EALLOW = 1 Non CPU emulation registers write access enabled.<br>EALLOW = 0 Non CPU emulation registers write access disabled<br>EALLOW bit is cleared at reset.<br>The current state of EALLOW is automatically saved during an interrupt/trap operation. The EALLOW bit is automatically cleared by the interrupt or trap. At the very start of an interrupt service routine (ISR), access to the non-CPU emulation registers is disabled. The user can re-enable access using the instruction: bit(ST1,EALLOW) = #1. The [d]return_int instruction restores the previous state of the EALLOW bit saved on the stack. The emulation module can override the EALLOW bit (clear only). The clear from The emulation module can occur on any pipeline slot. In case of conflict the emulator access get the highest priority. The CPU has the visibility on emulator override from EALLOW bit read. |
| DBGM | bit 15: Debug enable mask bit<br>DBGM = 1 Blocks debug events from time critical portions of the code execution. Debug access is disabled.<br>DBGM = 0 Debug access is enabled.<br>The current state of DBGM is automatically saved during an interrupt/trap operation. The DBGM bit is automatically set by the interrupt or trap. At the very start of an interrupt service routine (ISR), the debug events are blocked. The user can re-enable debug access using the instruction bit(ST1,DBGM) = #0.<br>The [d]return_int instruction restores the previous state of the DBGM bit saved on the stack. The pipeline protection scheme requires that DBGM can be set/clear only by the dedicated instruction bit(ST1,k4) = #1, bit(ST1,k4) = #0. ST1 access as memory mapped register or bit(Smem,k4) = #0, bit(Smem,k4) = #1, cbit(Smem,k4) have no effect on DBGM status bit. Emulation has R/W access to DBGM through DT-DMA.<br>DBGM is set at reset. DBGM is ignored in STOP mode emulation from software policy. estop_0() and estop_1() instructions will cause the device to halt regardless of DBGM state. |
| INTM | Global Interrupt Enable |

TABLE 15

Status/Control Register ST3

| | |
|---|---|
| HOMP | Bit 0: Host of only access mode to Peripherals |
| HOMR | Bit 1: Shared access mode to HPI RAM 802 |

TABLE 15-continued

Status/Control Register ST3

| | |
|---|---|
| HOMX | Bit 2: Host only access mode: |
| HOMY | Bit 3: Host only access mode: This bit operates the same as HOMX. |
| HINT | Bit 4: Host interrupt |
| XF | Bit 5: External Flag: |
| CBERR | Bit 6: CPU bus error: |
| MP/NMC | Bit 11: Microprocessor/microcomputer mode: |
| AVIS | Bit 12: Address visibility mode |
| CACLR | Bit 13: Cache clear |
| CAEN | Bit 14: Cache enable |
| CAFRZ | Bit 15: Cache freeze |
| ST3[10:7] | Unused status register bits |

Figure 15A:
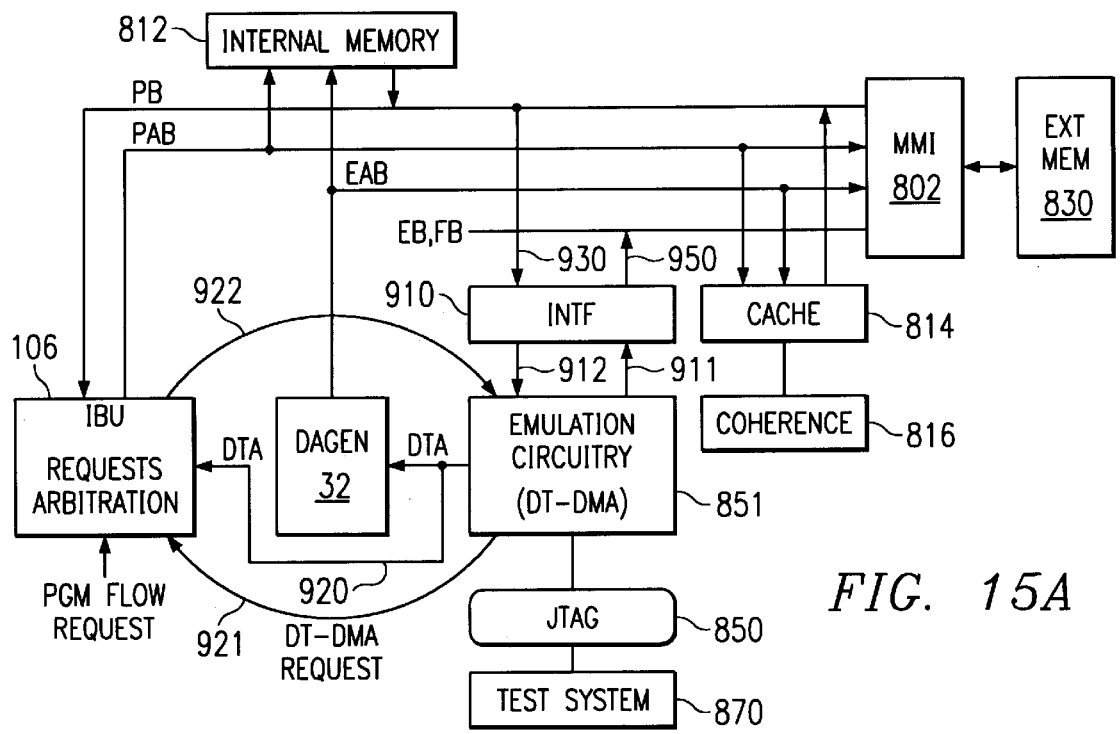
FIG. 15A is a block diagram illustrating the emulation circuitry of FIG. 14 in more detail.

FIG. 15A is a block diagram illustrating emulation circuitry of FIG. 14 in more detail. Emulation circuitry 851 provides common debug accesses (read and writing of memory and registers) without direct CPU intervention through a Debug and Test Direct Memory Access (DT-DMA) mechanism. Since these accesses intrude on CPU time, they can be optionally blocked by disabling the debug mode (DBGM) by setting a bit in status/control register 1 (ST1). This can be overridden using debugger software. Under normal debugger operation, the DT-DMA accesses use very minimal CPU time. For example, consider that a debugger screen contains 1,000 memory words to access and the screen is updated 10 times per second. The debugger will perform 10,000 DT-DMA accesses per second. Assume that each DT-DMA access takes one cycle of CPU time (this is a very simplistic estimate), and the CPU is running at a 100 MIP (10 ns per cycle). The debug overhead will be 0.01% (if a DT-DMA access takes multiple cycles, then multiply that number by 0.01% to get the overhead rate). Note that the information shown on the debugger screen is gathered at different times from the target, so it does not represent a snapshot of the target state, but rather a composite. It also takes the host time to process and display the data, so the display does not correspond to the current target state, but rather to the target state as of a few milliseconds ago.

Access to memory-mapped peripheral registers by a test host is also done through the DT-DMA mechanism. Because the DT-DMA mechanism uses the same memory access mechanism as the CPU, any read or write access that the CPU can perform in a single operation can be done via a DT-DMA memory access. The DT-DMA mechanism will present an address via address bus 920 (and data via interface 910, in the case of a write) to the CPU, which will perform the operation during an open bus cycle slot. DT-DMA request signal 921 is asserted by the emulation circuitry to request a read or write transaction. Once the CPU has obtained the desired data, it is presented back to the DT-DMA mechanism. DT-DMA ready signal 922 is asserted by IBU 106 to indicate that a requested data item is available to the emulation circuitry. Bus 920 and interface 910 collectively are included in bus 853 of FIG. 14.

Figure 15B:
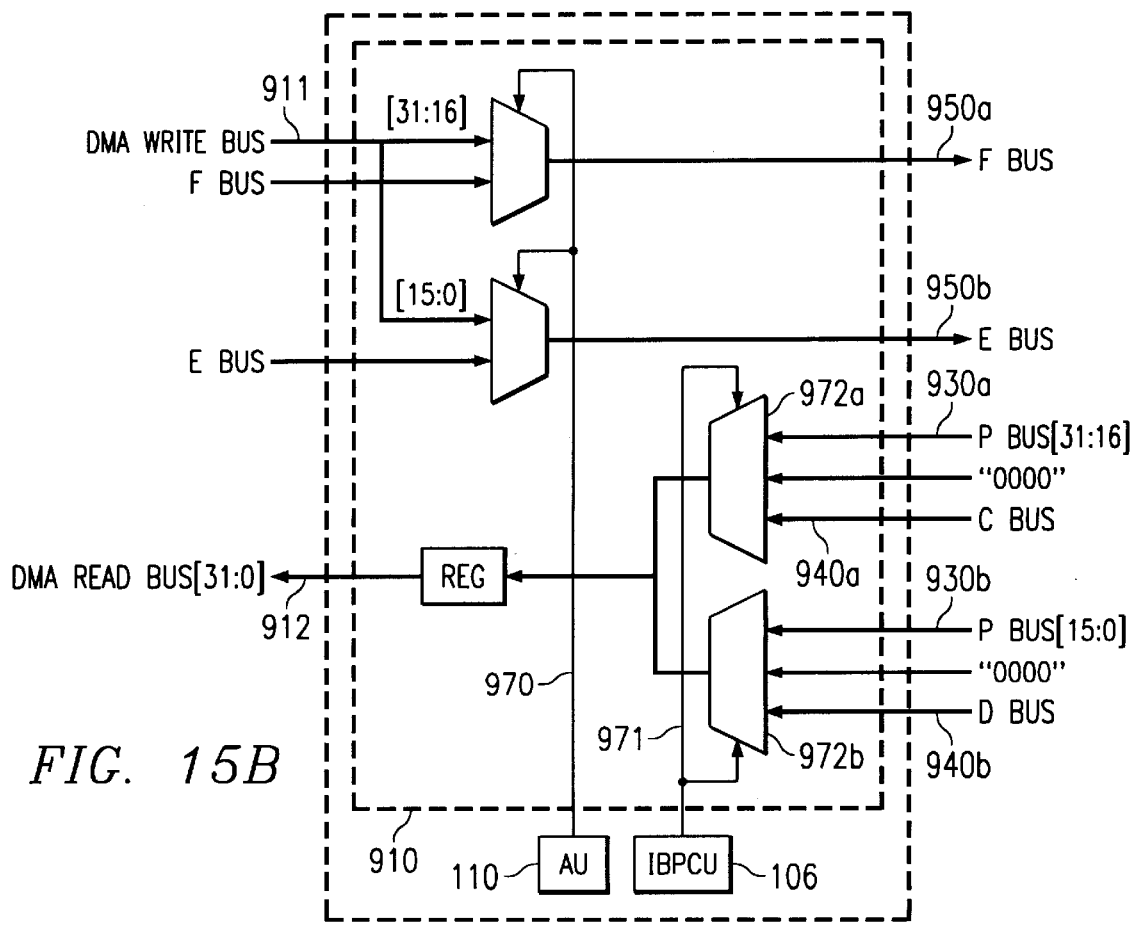
FIG. 15B is a block diagram illustrating the emulation interface circuitry of FIG. 15A in more detail.

FIG. 15B is a block diagram illustrating emulation interface circuitry 910 of FIG. 15A in more detail. DT-DMA write bus 911 provides data to be written from the emulation logic to the main write buses of processor 100, Ebus 950a and Fbus 950b. DT-DMA read bus 912 receives either a requested instruction or data and sends it to the emulation circuitry. For instruction read requests, IBU 106 schedules a read request in response to a request 921 from the emulation circuitry and a DT-DMA address is placed on program address bus PAB. The requested instruction is then taken from program bus 930 in response to selection signal 971 from the instruction buffer unit 106 and sent to the emulation circuitry on read bus 912.

For a data write, DAGEN 32 schedules a write request in response to a request 921 from the emulation circuitry and a DT-DMA address is placed on the address bus EAB. Write data is simultaneously placed on the Ebus 950a and the Fbus 950b in response to control signal 970 from the AU. According to an aspect of the present invention, a tag signal on address bus EAB is also asserted by DAGEN 32 in response to the DT-DMA request so that the write transaction can be identified as such by instruction cache 814, which monitors the write address bus EAB.

The DT-DMA data reads are handled in a similar manner, using read buses CB 930a and DB 930b. Select signals 971 control multiplexers 972a and 972b to select either an instruction from the program bus PB, data from the read buses CB, DB, or a fixed data value of "0."

The DT-DMA mechanism can operate in either a preemptive or non-preemptive mode. In non preemptive mode, the DT-DMA mechanism waits for the desired memory bus(ses) to be unused for a cycle (referred to as a hole), at which point the DT-DMA mechanism uses it to The debug-and-test direct memory access (DT-DMA) mechanism provides access to memory, CPU registers, and memory-mapped registers (such as emulation registers and peripheral registers) without direct CPU intervention. DT-DMAs intrude on CPU time; however, they can be blocked by setting the debug enable mask bit (DBGM) in ST1.

Because the DT-DMA mechanism uses the same memory-access mechanism as the CPU, any read or write access that the CPU can perform in a single operation can be done by a DT-DMA. The DT-DMA mechanism presents an address (and data, in the case of a write) to the CPU, which performs the operation during an unused bus cycle (referred to as a hole). Once the CPU has obtained the desired data, it is presented back to the DT-DMA mechanism. The DT-DMA mechanism can operate in the, following modes:

Non-preemptive mode. The DT-DMA mechanism waits for a hole on the desired memory buses. During the hole, the DT-DMA mechanism uses them to perform its read or write operation. These holes occur naturally while the CPU is waiting for newly fetched instructions, such as during a branch.

Preemptive mode. In preemptive mode, the DT-DMA mechanism. forces the creation of a hole and performs the access.

Non-preemptive accesses to zero-wait-state memory take no cycles away from the CPU. If wait-stated memory is accessed, the pipeline stalls during each wait state, just as a normal memory access would cause a stall. In real-time mode, DT-DMAs to program memory cannot occur when application code is being run from memory with more than one wait state.

DT-DMAs can be polite or rude:

Polite accesses. Polite DT-DMAs require that DBGM=0.

Rude accesses. Rude DT-DMAs ignore DBGM.

Figure 16:
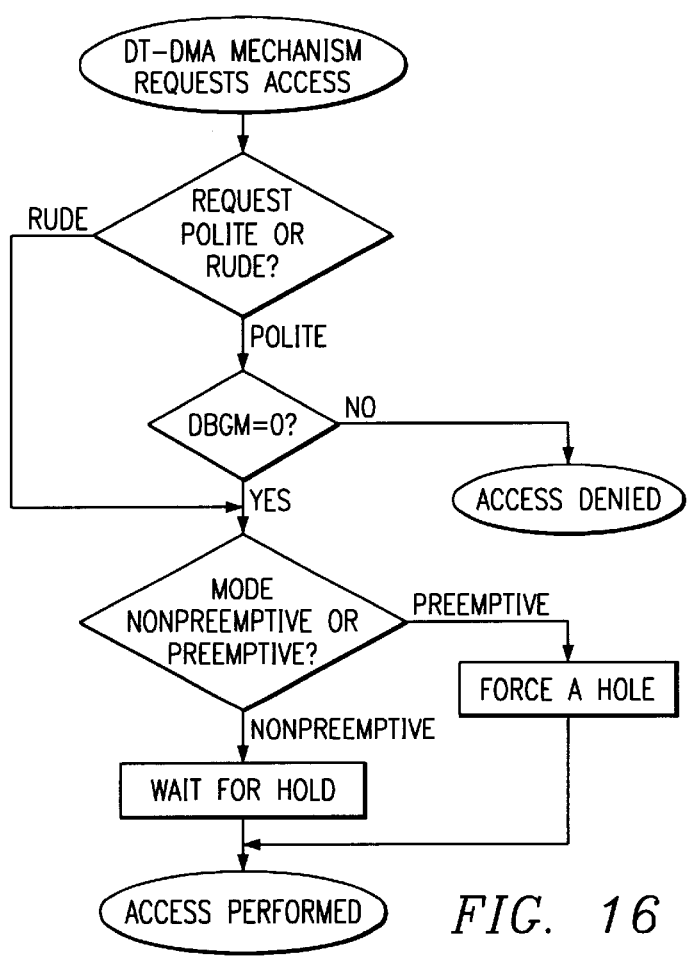
FIG. 16 is a flow chart illustrating the process for handling a DT-DMA request.

FIG. 16 summarizes the process for handling a request from the DT-DMA mechanism.

Some key concepts of the DT-DMA mechanism are:

Even if DBGM=0, when the mechanism is in non-preemptive mode, it must wait for a hole. This minimizes the intrusiveness of the debug access on a system.

Real-time-mode accesses are typically polite (although there may be reasons, such as error recovery, to perform rude accesses in real-time mode). If the DBGM bit is permanently set to 1 due to a coding bug but it is necessary to regain debug control, a rude access can be used, which ignores the state of DBGM.

In stop mode, DBGM is ignored, and the DT-DMA mode is set to preemptive. This ensures that a user can gain visibility to and control of a system if an otherwise unrecoverable error occurs (for example, if ST1 is changed to an undesired value due to stack corruption).

The DT-DMA mechanism does not cause a program-flow discontinuity. No interrupt-like save/restore is performed. When a preemptive DT-DMA forces a hole, no program address counters increment during that cycle.

A DT-DMA request awakens the device from the idle state (initiated by the IDLE instruction). However, unlike returning from an interrupt, the CPU returns to the idle state upon completion of the DT-DMA.

Figure 17A:
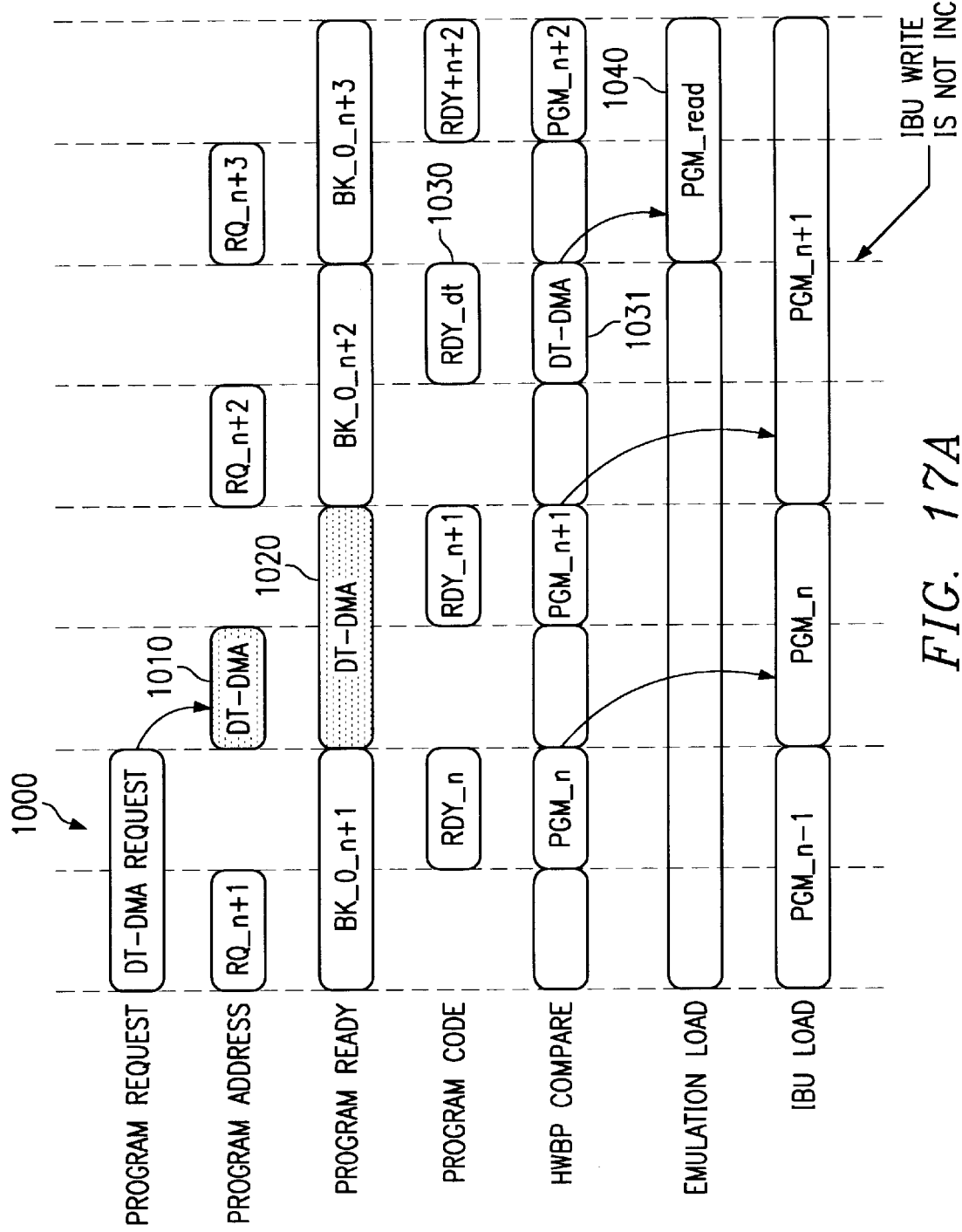
FIG. 17A is a timing diagram illustrating a DT-DMA read request by the emulation circuitry of FIG. 15.

FIG. 17A is a timing diagram illustrating a DT-DMA read request by the emulation circuitry of FIG. 15. DT-DMA request signal 921 is asserted as shown at time 1000. A request is scheduled in IBU 106 at time 1010 and a DT-DMA address is placed on program address bus PAB at time 1020. DT-DMA ready signal 922 is asserted at time 1030 indicating that a requested instruction 1031 is on program bus PB. The requested instruction is transferred to the emulation circuitry on read bus 912 at time 1040.

Figure 17B:
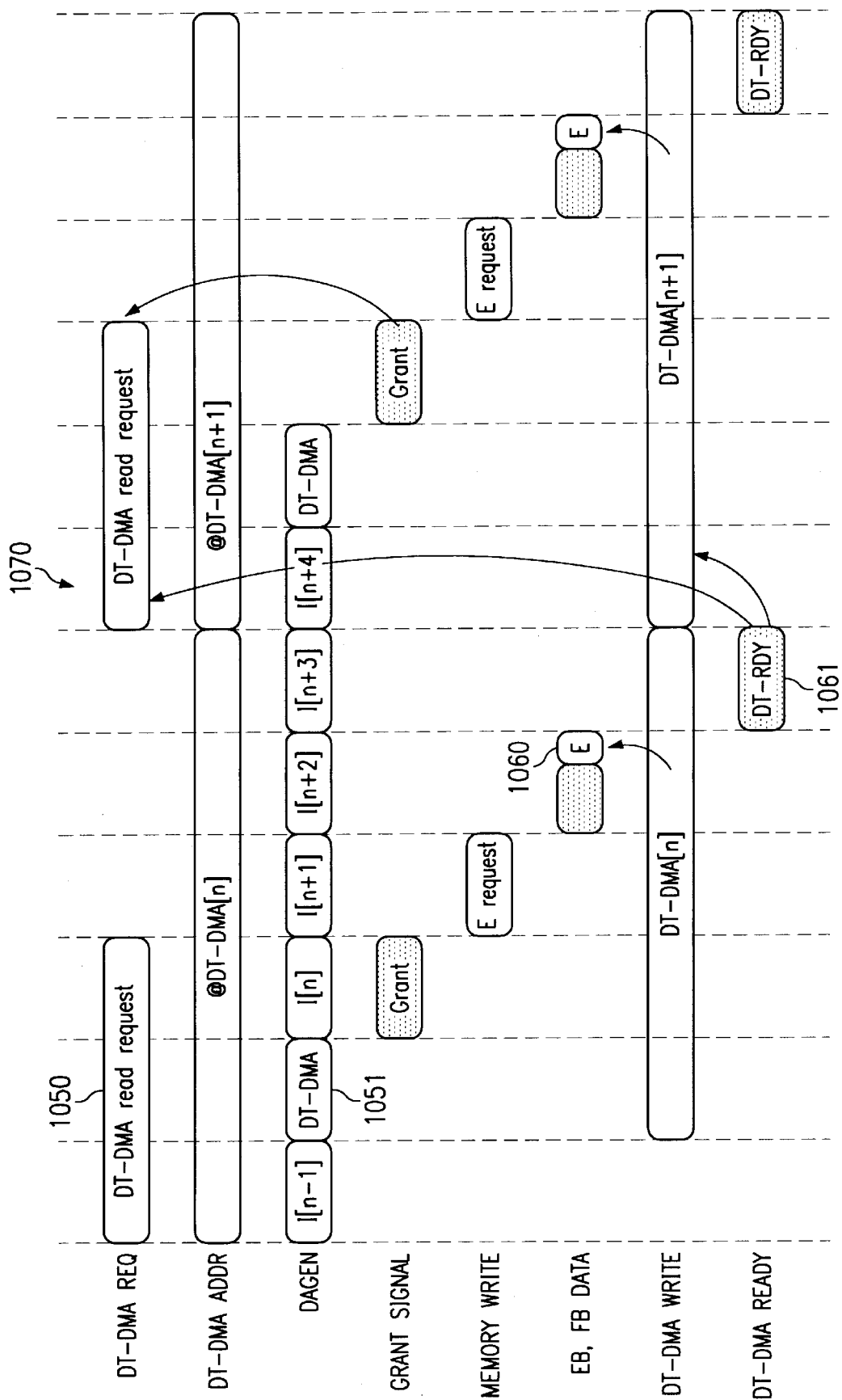
FIG. 17B is a timing diagram illustrating a DT-DMA write request by the emulation circuitry of FIG. 14.

FIG. 17B is a timing diagram illustrating a DT-DMA write request by the emulation circuitry of FIG. 15. A DT-DMA request 921 is made at time 1050. The DT-DMA request is scheduled in the DAGEN pipeline at time 1051. At time 1060, the DT-DMA write data is placed on the write buses EB and FB along with a DT-DMA write address on write address bus EAB. According to an aspect of the present invention, a DT-DMA tag signal is also asserted at this time on write address bus EAB so that the instruction cache can maintain coherency, as will be explained in more detail later. Coherence circuitry 816 monitors address bus EAB and causes cache 814 to invalidate a cache entry, if the address of a cache entry matches the DT-DMA write address. At time 1061, DT ready signal 922 is asserted to conclude the DT-DMA transaction.

In addition to preemptive and non-preemptive modes, a DT-DMA access can be either "rude" or "polite". Polite DT-DMA accesses require DBGM to be enabled. Rude DT-DMA accesses ignore DBGM. All stopmode accesses are rude, whereas real-time accesses are typically polite (there may be reasons, such as error recovery, to perform rude accesses in real-time). It is also possible to qualify DT-DMA accesses based on whether one is currently in a time-critical interrupt, using the HPI bit.

Some key concepts of the DT-DMA mechanism are:

It does not cause a PC discontinuity. No interrupt context save/restore is performed. When a NULL is jammed by a preemptive DT-DMA, the fetch counter and/or program counter do not increment during that cycle.

Polite accesses can be qualified using the DBGM bit. Even when the DT-DMA mechanism is enabled by DBGM, when it is in non-preemptive mode it must still wait for a hole. This minimizes the intrusiveness of the debug access on the user's system. If DBGM should be permanently disabled due to a coding bug but the user needs to regain debug control, then rude accesses can be used to gain control of the device, since rude accesses ignore the state of DBGM.

In stopmode, DBGM is ignored, and the DT-DMA mode is set to preemptive. This ensures that the user can gain visibility and control of their system should a normally unrecoverable error occur (such as ST1 being changed to an undesired value due to stack corruption).

A DT-DMA request will awaken the device from a low-power mode. However, unlike an interrupt, the CPU returns to the IDLE state upon completion of the DT-DMA.

In this embodiment, there are two forms of control over the processor's execution of code: stop-mode halts execution of all code whereas real-time mode allows selected interrupt service routines (ISRs) to be performed while execution of background code is halted. Background code refers to the main body of code, which is generally not as time-critical as the interrupt routines which service motor controls or high-speed timers. Real-time provides for the debug of code that interacts with interrupts that cannot be disabled. Stop-mode provides complete control of program execution, allowing for the disabling of all interrupts (including those which are non-maskable) and reset. Both execution modes can suspend program execution at break events, such as software breakpoint instructions or specified program or data accesses (i.e. analysis breakpoints or watchpoints) when the host or external hardware (XDS-524) requests it.

Real-time debug allows for the suspension of background program execution at break events while continuing to service time-critical interrupts (also referred to as foreground code). Program execution can actually be suspended in multiple locations—under certain circumstances it is desired to break within one time critical interrupt while still allowing others to be serviced. The suspension of execution is similar to the execution of an IDLE instruction. The pipeline flushes as instruction decode stops and all current pipeline activity completes. Interrupts can restart execution, but after the interrupt service routine is complete, the device returns to the suspended state (this differs from IDLE—after servicing an interrupt the device does not typically return to the IDLE state). When suspended, the debug interrupt enable register (DBGIER) is used in addition to the standard interrupt enable register (IER) to qualify pending interrupts. Interrupts must be enabled by both masks to interrupt the CPU when it is suspended, however, the global interrupt enable (INTM) is ignored. Suspending execution will add only one cycle to interrupt latency.

The DBGIER register serves to indicate which interrupts are time-critical. A debug status register DBGSTAT is physically implemented within the emulation circuitry in parallel with the status register ST1. This includes the DBGM, EALLOW and INTM bits. When a time-critical hardware interrupt is taken, the high priority interrupt active bit (HPI) in DBGSTAT is enabled (it's previous value is saved on the stack). HPI will be cleared when the last time-critical interrupt service routine completes and its previous DBGSTAT is popped off the stack. HPI is used to indicate whether certain break events should be performed. Note that HPI will be set whenever an interrupt enabled in the DBIMR register is taken—not just when execution was suspended. An INTR or TRAP instruction, with a corresponding bit set in DBIMR, will not set the HPI bit.

Stop-mode causes break events to suspend program execution at the next interrupt boundary (which is generally identical to the next instruction boundary). When execution is suspended, all interrupts (including reset and LEAD3 Emulation Functionality non-maskable interrupts) are ignored until the CPU receives a debug run directive. Stop-mode can be thought of as similar to real-time mode, except that no interrupts are considered time-critical (i.e. all code is background code). Should an interrupt occur simultaneously with a debug event, the debug event has priority. However, once the processing of an interrupt has begun, the CPU can not process a debug event until the first instruction boundary following one of these events.

Figure 18:
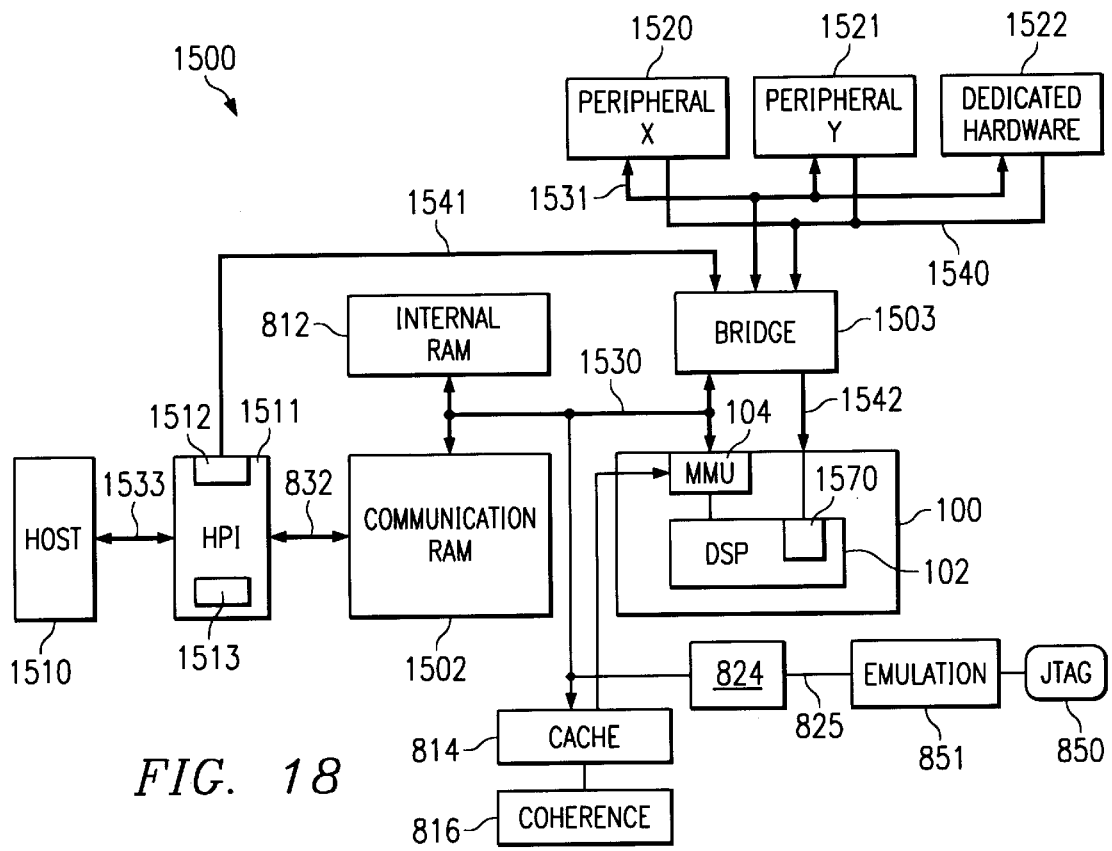
FIG. 18 is a block diagram illustrating an alternative embodiment of a digital system with the processor of FIG. 1, according to aspects of the present invention.

FIG. 18 is a block diagram illustrating an alternative embodiment of a digital system with DSP 100, according to aspects of the present invention. Digital system 1500 includes processor 100, as described earlier, and a second processor referred to as host processor 1510.

DSP core 100 performs digital signal processing related tasks, while host processor 1510 performs other application tasks. DSP 100 is connected to an internal program memory circuit 812 and to a dual ported communication memory circuit 1502 via bus 1530. Bridge 1503 is also connected to bus 1530 and provides access to peripherals 1520 and 1521 via bus 1531. Access is also provided via bus 1531 to dedicated hardware 1522, which includes various devices and circuits, such as timers, power controls, debugging and emulation circuitry, and such. Interrupt request signals 1540 provide interrupt requests from devices 1520–1522 to DSP 100.

Internal cache 814 provides faster instruction access time for processor 100. Emulation circuitry 851 with JTAG interface 850 and benchmark circuitry 852 was described earlier. Cache miss signal 816 provides benchmark events which are recorded by benchmark circuitry 852. Window circuitry 824 provides window enable signal 825, as explained earlier.

Host processor 1510 is connected to host processor interface circuit (HPI) 1511 via bus 1533. HPI 1511 provides buffering and timing control to allow host processor 1510 to access communication memory circuit 1502 via bus 1532. In this manner, host processor 1510 can store and access data values in communication memory 1502 that can also be stored and accessed by DSP 100. Bus 1532 is separate from bus 1530 and communication memory 1502 is arranged such that host processor 1510 can access data values in dual ported memory circuit 1502 in a manner that does not impinge on the operation of memory circuit 812. Interrupt request signals 1541 provide interrupt requests from host processor 1510 to DSP 100.

Host Port Interface 1511 has two registers, an interrupt register 1512 for asserting interrupt requests and status register 1513 for the HPI operational modes. Both registers are accessible by host 1510 via bus 1533. Interrupt register 1512 is operable to assert host interrupt requests to processor 100 in response to a write transaction from host 1510.

Emulation circuitry 851 implements the state machine described with reference to FIG. 3.

Figure 19:
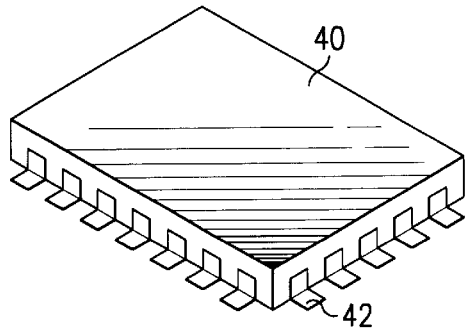
FIG. 19 is a schematic representation of an integrated circuit incorporating the processor.

FIG. 19 is a schematic representation of an integrated circuit incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 20:
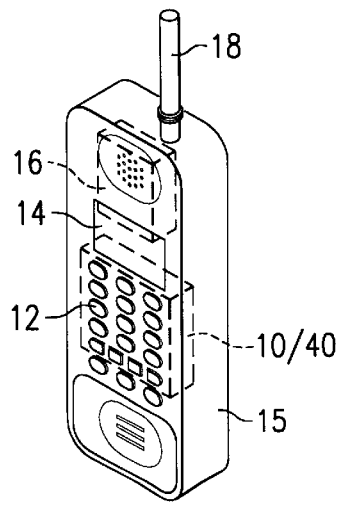
FIG. 20 is a schematic representation of a telecommunications device incorporating the processor of FIG. 1.

FIG. 20 illustrates an exemplary implementation of an example of such an integrated circuit in a mobile telecommunications device, such as a mobile telephone with integrated keyboard 12 and display 14. As shown in FIG. 20, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described emulation and debug circuitry that can be incorporated into a variety of digital systems. A stop mode of operation is provided in which an associated processor stops processing instructions in response to a debug event. A real-time mode of operation is provided in which the processor stops processing background instructions in response to a debug event, but in which high priority interrupts are still processed. Interrupts are classified and processed accordingly when the processor is stopped by a debug event. While suspended for a debug event, a frame counter keeps track of interrupt debug state if multiple interrupts occur. While running or suspended, the emulation circuitry can jam an instruction into the instruction register of the processor to cause processor resources to be read or written on behalf of the emulation circuitry. Read/write transactions are qualified by an expected frame count to maintain correspondence between test host software and multiple debug/interrupt events.

An embodiment of a processor core is provided that is a programmable digital signal processor (DSP) with variable instruction length, offering both high code density and easy programming. Architecture and instruction set are optimized for low power consumption and high efficiency execution of DSP algorithms, such as for wireless telephones, as well as pure control tasks. This processor is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. Instructions can be executed in a parallel manner, either in response to implicit parallelism or in response to user defined parallelism.

Advantageously, DT-DMA accesses can be performed without stopping the execution of code, so that the system environment, memory access conflicts and priorities are not changed. Advantageously, instructions can be jammed while the machine is running code or in the suspended state. Likewise, CPU registers can be read or written while the machine is running An embodiment of the invention is a processor that provides debug access to registers without causing the code execution timing to change, by using bus holes, etc.

Another embodiment of the invention is a processor that allows the dynamic jamming of instructions while running or during suspended execution without changing status if the code is running As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a processor, wherein the processor is operable to execute a sequence of instructions obtained from an instruction bus connected to an instruction memory circuit, wherein the processor comprises:

system resources including registers and at least one memory circuit;

an instruction pipeline operable to decode the sequence of instructions, access operands from system resources, and store results in the system resources;

test port circuitry for receiving test commands from a remote test host;

emulation circuitry for debug events connected to the test port circuitry, operable to cause the processor to enter a debug suspend state in response to a debut event and to leave the debug suspend state to resume execution of the sequence of instruction in response to a command received by the test port circuitry, wherein execution of the sequence of instructions ceases while the processor is in the debug suspend state; and further comprising detection circuitry operable to detect a bubble in the instruction pipeline during which no system resource is being accessed in response to executing the sequence of instructions; and jamming circuitry connected to the instruction pipeline operable to jam an access for a system resource in response to an access command received by the test port circuitry into the bubble detected by the detection circuitry, whereby the access of the system resources in response to the access command is performed without delaying the instruction pipeline when the processor is not in the debug suspend state.

2. The digital system of claim 1, wherein the detection circuitry is operable to detect a bubble when the processor is in an idle state due to an idle instruction that is part of the sequence of instruction, so that an access to a system resource is performed in response to a test command received by the test port circuitry when the processor is in an idle state, such that execution of the sequence of instructions is not interrupted.

3. The digital system of claim 1 being a cellular telephone, further comprising:

an integrated keyboard connected to the processor via a keyboard adapter;

a display connected to the processor via a display adapter;

radio frequency (RF) circuitry connected to the processor; and an aerial connected to the RF circuitry.

4. The digital system of claim 1, further comprising additional jamming circuitry connected to the instruction pipeline and connected to be responsive to the test port circuitry, and wherein the additional jamming circuitry is operable to jam a null instruction into the instruction pipeline while the processor is executing the sequence of instructions such that a bubble is formed in the instruction pipeline; such that a system resource can be accessed in response to the access command received by the test port circuitry by using the bubble created by the null instruction and detected by the detection circuitry while the instruction pipeline continues execution of the sequence of instructions.

5. The digital system of claim 4, further comprising an execution mode bit accessible by the processor, wherein when the execution mode bit is in a first state, the jam circuitry is enabled to make accesses to system resources, and when the execution mode bit is in a second state the jam circuitry is inhibited from making accesses to system resources; whereby test port accesses during execution of a critical segment of instructions can be inhibited.

6. The digital system of claim 5, wherein the jamming circuit has means for placing it in either a rude mode or in a polite mode, such that while in the rude mode the execution mode bit is ignored such that a resource access is jammed even when the execution mode bit is in the second state, and while in the polite mode the execution mode bit is obeyed.

7. The digital system of claim 1, wherein the jamming circuit has means for placing it in preemptive mode or in a non-preemptive mode, such that while in the non-preemptive mode the jamming circuitry waits for a bubble and while in the preemptive mode the jamming circuitry does not wait for a bubble such that a resource access is jammed upon receipt of an access command without waiting for a bubble.

8. A method of operating a digital system comprising a processor with system resources including registers and at least one memory circuit, comprising the steps of:

executing a sequence of instructions obtained from an instruction bus connected to an instruction memory circuit;

receiving an access command from a remote test host;

accessing the system resources in response to the access command while the processor is executing the sequence of instructions such that execution of the sequence of instructions is not discontinued by the access of the system resources;

detecting an access hole in the instruction pipeline during which no system resource is being accessed in response to executing the sequence of instructions; and wherein the step of accessing is enabled only when an access hole is detected so that the instruction pipeline continues execution of the sequence of instructions without interruption.

9. The method of claim 8, further comprising the step of jamming a null instruction into an instruction pipeline of the processor while the processor is executing the sequence of instructions such that an access hole is formed in the instruction pipeline, wherein the step of accessing is performed by using the access hole created by the null instruction while the instruction pipeline continues execution of the sequence of instructions.

10. The method of claim 8, further comprising the step of setting an execution mode in response to the sequence of instructions, wherein when the execution mode is in a first state, the step of accessing is enabled to make accesses to system resources, and when the execution mode is in a second state the step of accessing is inhibited from making accesses to system resources; whereby test accesses during execution of a critical segment of instructions can be inhibited.

11. The method of claim 10, further comprising the step of setting a request mode to either rude mode or polite mode, such that while in the polite mode the execution mode is obeyed and while in the rude mode the execution mode is ignored such that the step of accessing proceeds without regards to the execution mode.

12. The method of claim 8, further comprising the step of setting an access mode to either a preemptive mode or to a non-preemptive mode, such that while in the non-preemptive mode the step of accessing waits for an access hole; and while in the preemptive mode the step of accessing occurs upon receipt of an access command and further performs the step of jamming a null instruction into the instruction pipeline of the processor while the processor is executing the sequence of instructions such that an access hole is formed in the instruction pipeline.

13. A digital system comprising a processor, wherein the processor is operable to execute a sequence of instructions obtained from an instruction bus connected to an instruction memory circuit wherein the processor comprises:

system resources including the instruction memory circuit and memory mapped registers connected to the processor;

test port circuitry for receiving access commands from a remote test host; and emulation circuitry connected to the test port circuitry;

an instruction pipeline operable to decode the sequence of instructions, access the system resources to obtain operands, and access system resources to store results;

detection circuitry operable to detect a hole in the instruction pipeline during which no system resource is being accessed during execution of the sequence of instructions; and wherein the emulation circuitry comprises access circuitry connected to the instruction pipeline operable to insert an access request for a system resource into the hole detected by the detection circuitry, whereby an access of the system resources in response to the an access command is performed without interrupting the instruction pipeline.

14. The digital system of claim 13, wherein the access circuitry is operable to insert an access request into the instruction pipeline when the processor is in an idle state due to an idle instruction that is part of the sequence of instruction, so that an access to a system resource is performed in response to a test command while the processor remains in the idle state, such that execution of the sequence of instructions is not interrupted.

15. The digital system of claim 13, wherein the emulation circuitry further comprising jamming circuitry connected to the instruction pipeline and connected to be responsive to the test port circuitry, and wherein the jamming circuitry is operable to jam a null instruction into the instruction pipeline while the processor is executing the sequence of instructions such that a hole is formed in the instruction pipeline; such that a system resource can be accessed in response to the access command by using the hole created by the null instruction while the instruction pipeline continues execution of the sequence of instructions.

16. The digital system of claim 15, further comprising an execution mode bit accessible by the processor, wherein when the execution mode bit is in a first state, the access circuitry is enabled to make accesses to system resources, and when the execution mode bit is in a second state the access circuitry is inhibited from making accesses to system resources; whereby test port accesses during execution of a critical segment of instructions can be inhibited.

17. The digital system of claim 16, wherein the emulation circuit has means for placing it in either a rude mode or in a polite mode, such that while in the polite mode the execution mode bit is obeyed, but while in the rude mode the execution mode bit is ignored such that a resource access request is inserted even when the execution mode bit is in the second state.

18. The digital system of claim 15, wherein the emulation circuit has means for placing it in a preemptive mode or in a non-preemptive mode, such that while in the non-preemptive mode the access circuitry waits for a hole and while in the preemptive mode the access circuitry does not wait for a hole such that a resource access requested is inserted in the instruction pipeline upon receipt of an access command without waiting for a hole.

19. A digital system comprising a processor, wherein the processor is operable to execute a sequence of instructions obtained from an instruction bus connected to an instruction memory circuit, wherein the processor comprises:

system resources including the instruction memory circuit and memory mapped registers connected to the processor;

test port circuitry for receiving access commands from a remote test host;

emulation circuitry connected to the test port circuitry wherein the emulation circuitry is operable to access the system resources in response to an access command while the processor is executing the sequence of instructions such that execution of the sequence of instructions continues during the emulation access;

a cache connected to the processor for caching program memory; and wherein the access circuitry provides a tag signal to the cache to indicate when an emulation write access is being performed, such that the cache is operable to maintain coherency by invalidating a matching entry in response to the emulation write access.

* * * * *